US007359531B2

(12) United States Patent
Endoh et al.

(10) Patent No.: US 7,359,531 B2
(45) Date of Patent: Apr. 15, 2008

(54) PROCESSOR WITH PERSONAL VERIFICATION FUNCTION AND OPERATING DEVICE

(75) Inventors: Toshio Endoh, Kawasaki (JP); Masaki Watanabe, Kawasaki (JP); Takahiro Aoki, Kawasaki (JP); Makoto Goto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 662 days.

(21) Appl. No.: 10/372,113

(22) Filed: Feb. 25, 2003

(65) Prior Publication Data

US 2004/0022421 A1    Feb. 5, 2004

(30) Foreign Application Priority Data

Jul. 31, 2002    (JP)    ............................. 2002-224122

(51) Int. Cl.
*G06K 9/00*    (2006.01)
(52) U.S. Cl. ...................... 382/115; 340/5.53; 340/5.83
(58) Field of Classification Search ........ 382/115–118; 340/5.53, 5.83
See application file for complete search history.

(56) References Cited

U.S. PATENT DOCUMENTS

| 4,699,149 | A |   | 10/1987 | Rice ............................ 128/664 |
| 5,229,764 | A | * | 7/1993  | Matchett et al. ............ 340/5.52 |
| 5,793,881 | A |   | 8/1998  | Stiver et al. ................. 382/115 |
| 6,193,153 | B1|   | 2/2001  | Lambert ...................... 235/380 |
| 6,330,346 | B1|   | 12/2001 | Peterson et al. ............ 382/115 |

FOREIGN PATENT DOCUMENTS

| DE | 44 21 237  | 12/1994 |
| DE | 198 37 429 | 2/2000  |
| JP | 1-503203   | 11/1989 |
| JP | 7-12373    | 1/1995  |

(Continued)

OTHER PUBLICATIONS

Cross, et al., "Thermographic Imaging of the Subcutaneous Vascular Network of the Back of the Hand for Biometric Identification", Institute of Electrical and Electronics Engineers 29th Annual 1995 International Carnahan Conference on Sanderstead, UK, pp. 20-35, Oct. 18, 1995.

(Continued)

*Primary Examiner*—Bhavesh M. Mehta
*Assistant Examiner*—John B Strege
(74) *Attorney, Agent, or Firm*—Staas & Halsey LLP

(57) ABSTRACT

A processor with a personal verification function has a mouse used by a hand to operate a terminal (personal computer or personal computer main body) and being able to output a photographic blood vessel image obtained by photographing a blood vessel image of the palm of the hand, and a verifying unit carrying out personal verification at a desired time on the basis of the photographic blood vessel image outputted from the mouse and a registration blood vessel image. The mouse has a radiating unit radiating near-infrared light toward the palm of the hand, and a photographing unit photographing the photographic blood vessel image with reflected light from the palm of the hand. The processor with a personal verification function and an operating device make possible personal authentication and personal identification at any time, and are operable within a saved-space without placing a burden on the user.

19 Claims, 14 Drawing Sheets

FOREIGN PATENT DOCUMENTS

| | | |
|---|---|---|
| JP | HEI 7-21373 | 1/1995 |
| JP | HEI 10-295674 | 11/1998 |
| JP | 11-119906 | 4/1999 |
| JP | HEI 11-149345 | 6/1999 |
| JP | 11-272613 | 10/1999 |
| JP | 2000-222123 | 8/2000 |
| JP | 2001-125734 | 5/2001 |
| JP | 2001-275722 | 3/2003 |
| WO | WO 97/17674 | 5/1997 |

OTHER PUBLICATIONS

European Search Report dated Jan. 5, 2006, in European Application No. 03251756.7-2218.

Japanese Patent Office Notice of Grounds of Rejection, mailed Feb. 1, 2007, and issued in priority Japanese Patent Application No. 2002-224122.

Japanese Office Action issued in corresponding Japanese Patent Application No. 2002-224122 mailed on May 8, 2007.

* cited by examiner

FIG. 7(a)

PHOTOGRAPHIC BLOOD
VESSEL IMAGE N1

|   | 0 | 1 | 2 | 3 | 4 |
|---|---|---|---|---|---|
| 0 | 255 | 255 | 0 | 255 | 255 |
| 1 | 255 | 255 | 0 | 0 | 0 |
| 2 | 255 | 255 | 0 | 255 | 0 |
| 3 | 0 | 0 | 255 | 0 | 0 |
| 4 | 0 | 0 | 0 | 255 | 0 |

FIG. 7(b)

REGISTRATION BLOOD
VESSEL IMAGE N2

|   | 0 | 1 | 2 | 3 | 4 |
|---|---|---|---|---|---|
| 0 | 255 | 255 | 0 | 0 | 255 |
| 1 | 255 | 255 | 255 | 0 | 0 |
| 2 | 255 | 255 | 0 | 255 | 255 |
| 3 | 0 | 0 | 255 | 255 | 0 |
| 4 | 0 | 0 | 0 | 255 | 255 |

PROCESSOR WITH PERSONAL VERIFICATION FUNCTION AND OPERATING DEVICE

BACKGROUND OF THE INVENTION (1) Field of the Invention

The present invention relates to a processor with a personal verification function and an operating device, which use differences in physical characteristics as identification information, in an information communication system.

(2) Description of Related Art

With development of networks, enterprises and local governments promote electronic information communication systems. In Japan, for example, electronic local governments, from which the residents can electronically get resident cards or the like, are under organization according to the e-Japan emphasis plan that the government announced in March, 2001. Additionally, the electronic commerce market keeps growing.

Such systems require a means (personal checking means) to ascertain whether a person who is now making an application or a deal in front of the display is certainly the person himself/herself. Heretofore, a magnetic card and a personal identification number (PIN) are used as means to confirm that a person is the person himself/herself without manual checking when the person enters into or leaves a facility, for example.

However, there are risks that these means may be lost, forgotten, stolen, etc. In an information communication system for an electronic local government, electric commerce, or the like, the users geographically scatter within a wide area, and various people from the old to the young may use the system over the network, thus the above risks are more serious.

For the above reason, there is vitally researched a technique using that a personal physical characteristic such as fingerprints, a face and the like differ from one person to another in order to obtain a means for personal check which cannot be lost, forgotten, stolen, etc. This technique uses a difference in physical characteristic of a user to perform authentication and identification.

Authentication is to determine, on the system's side, whether a user represented by a card or a PIN is the person himself/herself. Authentication signifies that the system determines whether a password inputted by a user agrees/disagrees with a password beforehand registered by the user, for example. In other words, authentication is to collate data of a user having been registered with data of a person now accessing to the system, corresponding to 1 (a password now inputted by a user) to 1 (a password beforehand registered by the person himself/herself) collation.

On the other hand, identification is to determine, on the system's side, that the person is a specific one of registered persons. When the system manages a person stepping into and out of, for example, a facility using his/her fingerprint, verification is to collate an obtained fingerprint with a number of registered fingerprints held by the system. In the case of identification, the system cannot know who a person accessing to itself is. Accordingly, identification corresponds to 1 (a fingerprint of an unknown person) to a number of persons (fingerprints of a number of persons having names) collation.

Hereinafter, "authentication" and "identification" are collectively referred as "personal verification". "Personal verification" will be used as a general term for authentication and identification, not having another meaning.

Generally, an opportunity of personal verification is once or twice on a specific one person. In case where a user logs in from a personal computer to a network, the number of times personal verification is carried out is one. Personal verification is carried out once when the personal computer is started, after that, the system does not know who handles the personal computer. When management of a person stepping into and out of a security room is carried out twice when the person steps into and steps out of the security room.

In the case of management of a person stepping into and out of a room or a building, it can be said that the security can be assured by carrying out the personal verification of the person only when the person steps into and out of the room or the building because the room or the building is physically separated. In the case of an information communication system of, for example, an electronic local government over a network, it is desirable that the personal verification is carried out anytime or periodically because there is a possibility that another person pretends to be the user within a moment that the user leaves his/her seat while the user logs in.

Next, publications will be described.

Japanese Laid-Open (Kokai) Publication No. 11-149345 (hereinafter referred as publication 1) discloses a space-saving mouse for information processing with a structure simplified by integrating an authentication input unit into the mouse for information processing.

The above technique can readily ensure security of inputted/outputted information without spoiling compactness, light-weight and portability of the mouse. Additionally, an area occupied by the working area can be decreased, and the fingerprint input unit can be easily maintained and changed.

When using the mouse described in the publication 1, the user needs to press his/her finger onto the mouse to obtain authentication with his/her fingerprint. Accordingly, it is difficult to detect the fingerprint at any time without a burden on the user.

Japanese Patent Publication No. 3224216 (hereinafter referred as publication 2) discloses a technique, in which a fingerprint detecting unit is provided to a mouse that is an external input unit to read an image of a fingerprint from the fingerprint detecting unit at predetermined time intervals, and the fingerprint data read out is collated with registered fingerprint data to identify the user.

When the user changes in the course, an access to the computer becomes impermissible because the fingerprint is collated at predetermined time intervals. This makes it possible to make up a computer system having a high degree of security.

There is another known technique using an image of blood vessels of a hand as one of physical characteristics in the personal verification technique based on physical characteristics. For example, Japanese Patent Laid-Open (Kokai) Publication No. 7-21373 (hereinafter referred as publication 3) describes a personal verification apparatus, which uses a blood vessel seen-through image which is an imaged blood vessel image under the skin of a hand. This personal verification apparatus obtains a blood vessel see-through image by penetration or reflection to carry out personal verification.

This technique can use biological information, which can be obtain more safely, with a less burden on the user, and has a smaller number of characteristics than fingerprints.

The personal verification technique based on physical characteristics using a blood vessel image of a hand has following features: placing a less burden on a person to be photographed; difficult to forge because the blood vessels lie inside the body; almost possible even on a rough skin of a hand; applicable to most of people; providing a relatively high accuracy of verification; less affected by extraneous light; not always requiring the hand to contact with the apparatus because the blood vessels can be recognized so long as they are within a view of the camera; etc.

When a blood vessel image is photographed with reflection of near-infrared light, veins flowing near the surface of a body apt to be photographed, which is equivalent to use of only an image of veins, practically. It has been experimentally indicated that only an image of veins can provide a sufficient degree of accuracy of verification.

For example, Japanese Patent Laid-Open (Kokai) Publication No. 10-295674 (hereinafter referred as publication 4) discloses a personal verification apparatus which identifies a person with an image of veins on the back of a hand photographed with reflection of near-infrared light.

The above apparatus can be manufactured at a low cost, can identify a person and is free from risks such as loss or stealth of a card key when the card key is employed. Additionally, there is no need to fix a hand at a predetermined position, which allows the apparatus to be used conveniently and have a high identification performance.

The user operates the operating equipment, holding it in his/her own hand. A sensor which can photograph the hand is attached to the operating equipment, thereby to detect a physical characteristic at any time with a less burden on the user. As compared with a case where a measurement device is separately disposed, it is possible to save a space to dispose the apparatus.

The information communication system cannot know whether a person who transacts is the person himself/herself even when the person carries out a large sum of transaction in electronic commerce over a network. Accordingly, the information communication system does not have a practical means, which can be manufactured at a reasonable cost and by which the information communication system can confirm a person at any time. Any one of the techniques disclosed in the publications 1 through 4 does not carry out personal verification at any time or periodically without a burden on the users.

Practically, it is very difficult to force a person to take the personal verification using a card or a password, at any time or periodically. If a fingerprint authentication apparatus requires the user to press his/her fingerprint many times or face her blood vessels of the palm of his/her hand to a camera many times, it can be said that the apparatus is inconvenient. Accordingly, it is necessary to invent a method of detecting physical characteristics with a less burden on the user.

A characteristic to be detected as a physical characteristic has to have an image which can be readily photographed, and provide a distinct difference in lightness. An image of a face is relatively easily photographed, thus a burden on the user is small, but the present techniques cannot provide a high accuracy of authentication. A reason of this is that elements such as a change in hair style, presence/absence of eye glasses, a direction of the face, an angle of illumination, a change in expression, make-up, an intensity of illumination, etc. degrade the authentication accuracy. For this, a wrist, the back of a hand, the palm of a hand, a finger or an ear is generally used.

To completely remove a burden on the user, an automatic photographing unit may be used to automatically pursue a moving hand and photograph blood vessels of the palm of the hand. However, this is not practical in terms of price.

Further, it is desirable that a space to set the apparatus for detection is as much as small.

SUMMARY OF THE INVENTION

In the light of the above problems, an object of the present invention is to provide a processor with a personal verification function and an operating device, which can carry out personal authentication and personal identification at any time, and operate within a saved space without placing a burden on the user.

Therefore, the present invention provides a processor with a personal verification function comprising an operating device used by a hand to operate a terminal, and being able to output a photographic blood vessel image obtained by photographing a blood vessel image of a palm of the hand, and a personal verification unit for carrying out personal verification at a desired time on the basis of a photographic blood vessel image outputted from the operating device and a registration blood vessel image.

Accordingly, personal verification operable at any time in a saved space without a less burden on the user becomes possible.

The present invention further provides a processor with a personal verification function comprising an operating device having a radiating unit for radiating near-infrared light toward a palm of a hand and a photographing unit for photographing a photographic blood vessel image with reflected light from the palm of the hand, a storing unit for storing a registration blood vessel image, and a verifying unit for collating the photographic blood vessel image photographed by the photographing unit with the registration blood vessel image stored in the storing unit at a desired time to carry out personal verification.

Even when an event important in electronic commerce occurs, the information communication system can carry out authentication certainly.

The present invention still further provides a processor with a personal verification function comprising a main body device comprising a radiating unit for radiating near-infrared light onto a part of a body and a photographing unit for photographing a photographic blood vessel image using reflected light from the part of the body, a storing unit for storing a registration blood vessel image, and a verifying unit for collating the photographic blood vessel image photographed by the photographing unit with the registration blood vessel image stored in the storing unit at a desired time to carry out personal verification.

Accordingly, the information communication system can continuously authenticate a user who has been once permitted to be connected to a network, or to enter into a security room, and can determine whether a person who is connected to the network at present or is in the security room is the person himself/herself who has been given the permission.

The present invention still further provides a processor with a personal verification function comprising a portable terminal comprising a radiating unit for radiating near-infrared light onto a palm of a hand and a photographing unit for photographing a photographic blood vessel image using reflected light from the palm of the hand, a storing unit for storing a registration blood vessel image, and a verifying unit for collating the photographic blood vessel image photographed by the photographing unit with the registration blood vessel image stored in the storing unit at a desired time to carry out personal verification.

With a technique relating to biometric information, it is possible to detect a physical characteristic at any time to carry out personal verification.

The present invention still further provides an operating device comprising an operating means used by a hand to operate a terminal with a click or a movement thereof, a radiating unit for radiating near-infrared light toward a palm of the hand, and a photographing unit for photographing a photographic blood vessel image using reflected light from the palm of the hand.

Accordingly, it is possible to reduce a burden on the user when a physical characteristic of the user is detected, save the space to install the detecting apparatus, and maintain a high authentication accuracy.

The operating device may comprise a radiating unit for radiating near-infrared light toward the palm of the hand and a photographing unit for photographing the photographic blood vessel image using reflected light from the palm of the hand.

The operating device may use a communication path as both a first communication path for transmitting data relating to operations to the terminal and a second communication path for transmitting the photographic blood vessel image to the personal verification unit.

Accordingly, it is possible to put together communication cables into one, omit wasteful wiring and decrease an effect by a fault occurring in the communication path. It is also possible to simplify the communication cables, improve the system relatively easily, and improve the cost performance.

The personal verification unit may comprise a verification time determining unit for determining a verification time. The personal verification unit may determine the verification time according to a notice from an information processing unit performing a communication procedure process for a system requiring the personal verification, or determine the verification time according to a notice from the operating device.

The personal verification unit may determine the verification time on the basis of a result of determination made by a determining unit determining validity as to whether the photographic blood vessel image is suited to collation.

The personal verification unit may put together results of verification done with a plurality of photographic blood vessel images, and perform collation, or perform collation on the basis of results of verification done with a plurality of photographic blood vessel images.

The personal verification unit may comprise storing unit for storing the registration blood vessel image, and a verifying unit for collating the photographic blood vessel image photographed by the photographing unit with the registration blood vessel image stored in the storing unit at the desired time to carry out the personal verification.

Accordingly, high-accurate determination becomes possible.

The determining unit may output a warning when determining that the photographic blood vessel image is not valid, or may stop an operation of the system when determining that the photographic blood vessel image is not valid. The determining unit may determine whether a photographic blood vessel image photographed by the photographing unit is a blood vessel image on the basis of pixel values of the photographic blood vessel image. The determining unit may determine the validity on the basis of a difference between photographic blood vessel images photographed at one time and predicted time by the photographing unit.

When visible light is contained in a part of a blood vessel image photographed by the photographing unit, the determining unit may determine the validity on the basis of an intensity or a change with time of the visible light. Accordingly, stable verification becomes possible.

A mouse may be used as the operating device, a portion of the mouse contacting with the palm of the hand may be made from a material permeable of near-infrared light and formed to expand outwardly from the mouse. The mouse may comprise one or a plurality of reflecting units for reflecting radiated light. An optical axis of the near-infrared light is inclined toward a rear of the mouse away from the vertical direction.

A keyboard may be used as the operating device, and the radiating unit and the photographing unit may be disposed in a portion on the hands' side of the keyboard.

By disposing a camera for obtaining a blood vessel image in the mouse or the keyboard, it becomes possible to automatically photograph the blood vessel image many times without placing a burden on the user, successively carry out personal authentication with the photographed plural blood vessel images, and carry out reliable personal authentication.

The storing unit may store the photographic blood vessel image using an IC (Integrated Circuit) card. The IC card may have the personal verification unit. At least either the storing unit or the verifying unit may be disposed in the operating device, the terminal or a host terminal connected to the terminal.

The IC card may have an extracting function of extracting a blood vessel image. Accordingly, it is possible to prevent a loss caused by that a personal blood vessel image leaks to a third party, or that details of the verifying method becomes known. This allows improvement of the security.

BRIEF DESCRIPTION OF THE DRAWINGS

FIGS. 7(a) and 7(b) are diagrams for illustrating a method of calculating similarity according to the first embodiment of this invention;

DESCRIPTION OF THE PREFERRED EMBODIMENTS

Hereinafter, description will be made of embodiments of this invention with reference to the drawings.

(A) Description of First Embodiment of the Invention

Figure 1:
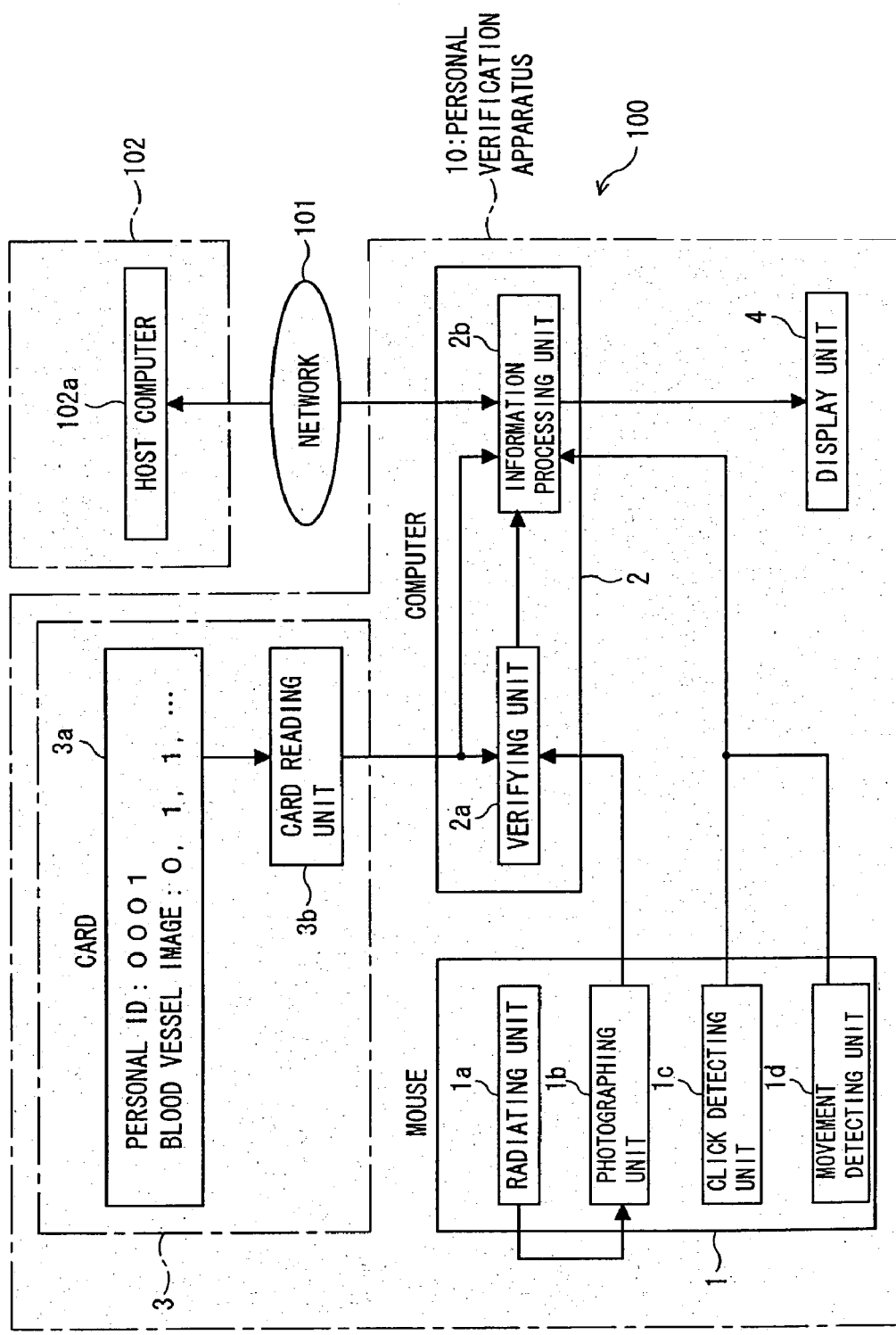
FIG. 1 is a schematic diagram showing a structure of an information communication system according to a first embodiment of this invention.

FIG. 1 is a schematic diagram of a structure of an information communication system according to a first embodiment of this invention. An information communication system 100 shown in FIG. 1 enables an electronic local government to electrically issue a resident card or the like to the user, or an enterprise or the like to carry out electronic commerce. The information communication system 100 is configured with a network 101, a processor with a personal verification function (alternatively referred as a personal verification apparatus of an operating device integrated type or a personal verification apparatus; hereinafter referred as a personal verification apparatus) 10, and a center 102. The network 101 is configured with a number of terminals having a data transmitting/receiving function connected to one another.

The personal verification apparatus 10 is a personal computer terminal having a mouse and a keyboard installed in a home or an office. The personal verification apparatus 10 has a data transmitting/receiving function, and successively carries out personal verification of a rightful user operating the personal verification apparatus 10. The center 102 is a local government or an enterprise providing an electronic commerce service, where a host computer (host terminal) 102a storing data of resident cards and the like or data relating to the electronic commerce is installed. The user accesses to the host computer 102 using the personal verification apparatus 10 to obtain a resident card or the like, or carry out a transaction in electronic commerce.

In the personal verification apparatus 10 according to this invention, a photographing unit 1b photographing a blood vessel image (blood vessel pattern) of the palm of a hand is built in a mouse, a keyboard or the like (operating device).

Figure 2:
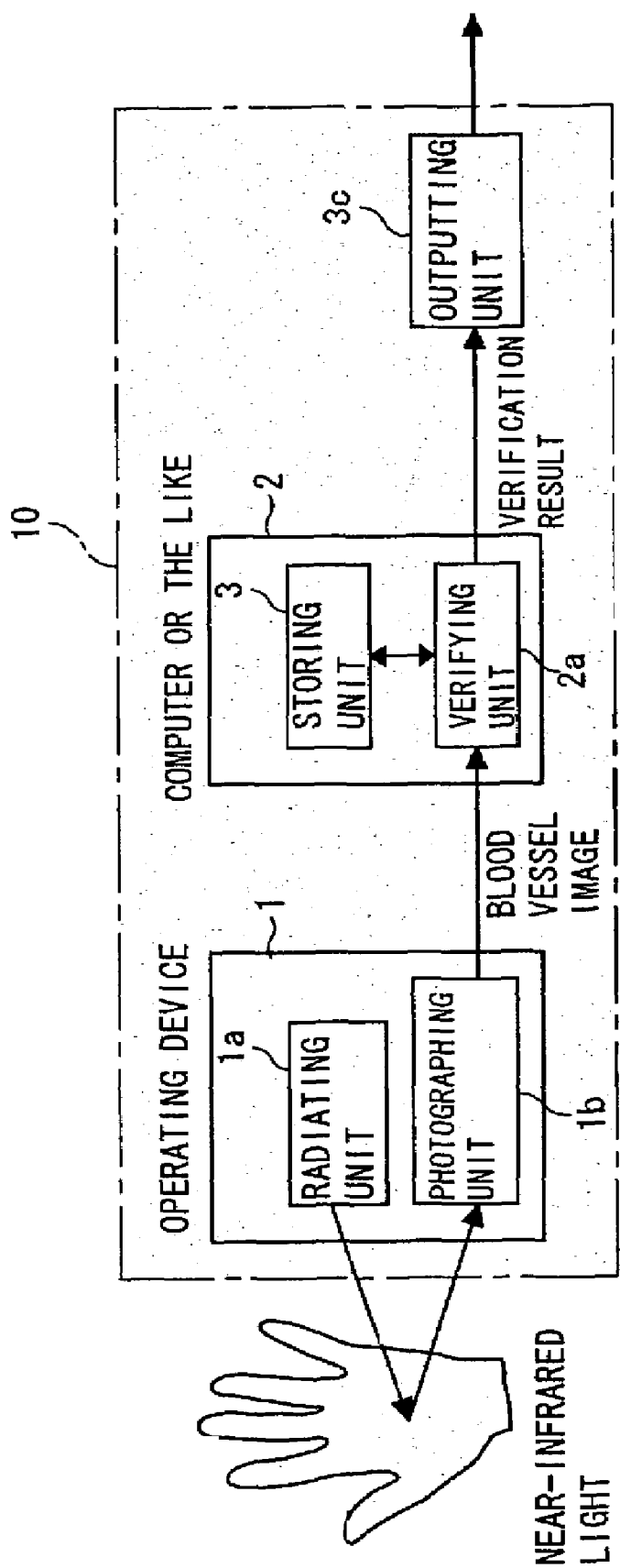
FIG. 2 is a block diagram of a processor with a personal verification function according to the first embodiment of this invention.

FIG. 2 is a block diagram of the personal verification apparatus 10 according to the first embodiment of this invention. The personal verification apparatus 10 shown in FIG. 2 comprises a mouse 1, a computer (personal verification unit) 2 and an output unit 3c. The mouse 1 is used by a hand to operate the terminal (personal computer or personal computer body), and is able to output a photographic blood vessel image obtained by photographing a blood vessel image of the palm of the hand. The computer 2 carries out personal verification at a desired time on the basis of the photographic blood vessel image outputted from the mouse 1 and a registration blood vessel image. The registration blood vessel image is beforehand stored by, for example, the user. The output unit 3c outputs a result of verification outputted from the computer 2. Now, description will be made of a personal verification process by means of a radiating unit 1a, a photographing unit 1b, a storing unit 3 and a verifying unit 2a shown in FIG. 2.

Figure 3:
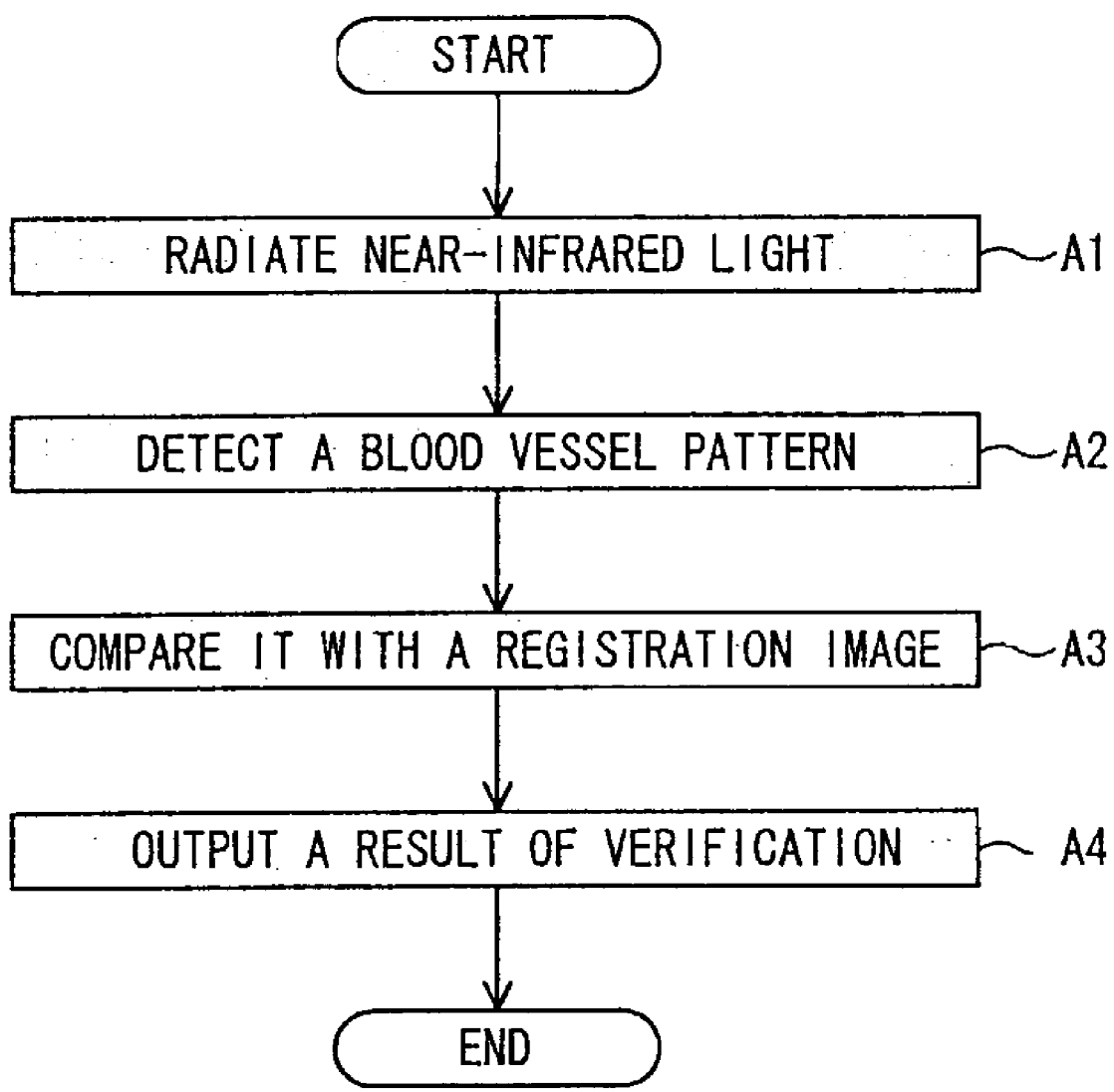
FIG. 3 is a flowchart for illustrating a personal verification process according to the first embodiment of this invention.

FIG. 3 is a flowchart for illustrating the personal verification process according to the first embodiment of this invention. The radiating unit 1a provided in the mouse 1 radiates near-infrared light onto a surface of the mouse 1 in proximity to the palm of a hand (step A1). The photographing unit 1b extracts a blood vessel image (detects a blood vessel pattern) reflected from the palm of the hand at a predetermined time (step A2), and inputs the extracted blood vessel image to the verifying unit 2a. The verifying unit 2a is connected to the storing unit 3 storing therein a registration blood vessel image of each user beforehand registered. At step A3, the verifying unit 2a determines whether the photographed blood vessel image agrees with the stored blood vessel image, thereby carrying out personal verification at a predetermined time. Results of this verification are successively transmitted to the center 102 via the outputting unit 3c at predetermined times (step A4). While the verification is successful, the user is connected to the host computer 102a to carry out a transaction in electronic commerce. When the verification is unsuccessful, the user cannot carry out the transaction in electronic commerce.

By integrating the operating device (mouse 1) and the photographing unit 1b, the photographing unit 1b inside the mouse 1 can photograph the palm of a hand of the user while the palm of the hand of the user contacts with the mouse 1. The information communication system 100 can automatically obtain an image of the palm of the hand without placing a burden on the user, thereby giving authentication to the user when the user gets a resident card or the like, or carries out a transaction in electronic commerce.

The storing unit 3 and the verifying unit 2a to be described later may be provided in the mouse 1, or the computer 2 connected in a short distance wire (or radio) communication, or the host computer 102a connected over the network 101. It is not always necessary to provide the storing unit 3 and the verifying unit 2a in the same computer 2. For example, an IC card may be used as the storing unit 3.

Since blood vessels of a hand have sparser information than fingerprints, it is necessary to do personal verification with a higher degree of accuracy than the personal verification using fingerprints. Accordingly, it is demanded to photograph a relatively wide area under stable conditions. Now, description will be made of a manner of photographing a wide area under stable conditions for each mouse 1. Incidentally, a manner with the keyboard will be described later, separately.

Each part of the personal verification apparatus 10 will be now described in detail.

The personal verification apparatus 10 comprises the mouse (operating device) 1, the computer (personal verification unit) 2 and the storing unit 3.

The mouse 1 is used by a hand to operate the terminal, and can output a photographic blood vessel image obtained by photographing a blood vessel image of the palm of the hand. The mouse 1 continuously carries out personal verification as to whether the user who is going to access to the host computer 102a is the person himself/herself. The mouse 1 comprises the radiating unit 1a, the photographing unit 1b, a click detecting unit 1c and a movement detecting unit 1d. The click detecting unit 1c detects that the user clicks. The movement detecting unit 1d detects movement of the mouse 1. The click detecting unit 1c and the movement detecting unit 1*d* in cooperation function as an operating unit (1*c*, 1*d*) for operating the terminal by a hand with a click and a movement thereof.

The mouse 1 may include a rotary wheel (not shown) provided between buttons for click, or may be of a wireless type using light. The radiating unit (near-infrared LED) 1*a* radiates near-infrared light toward the palm of a hand. It is preferable that a near-infrared LED (Light Emitting Diode) emitting near-infrared light is used as the radiating unit 1*a*. The photographing unit 1*b* photographs a photographic blood vessel image with reflected light from the palm of a hand.

In other words, the mouse 1 is operated by a hand to operate the computer 2 with a click and a movement thereof, including the radiating unit (near-infrared LED) 1*a* radiating near-infrared light toward the palm of a hand, and the photographing unit 1*b* photographing a photographic blood vessel image with reflected light from the palm of the hand.

Figure 4:
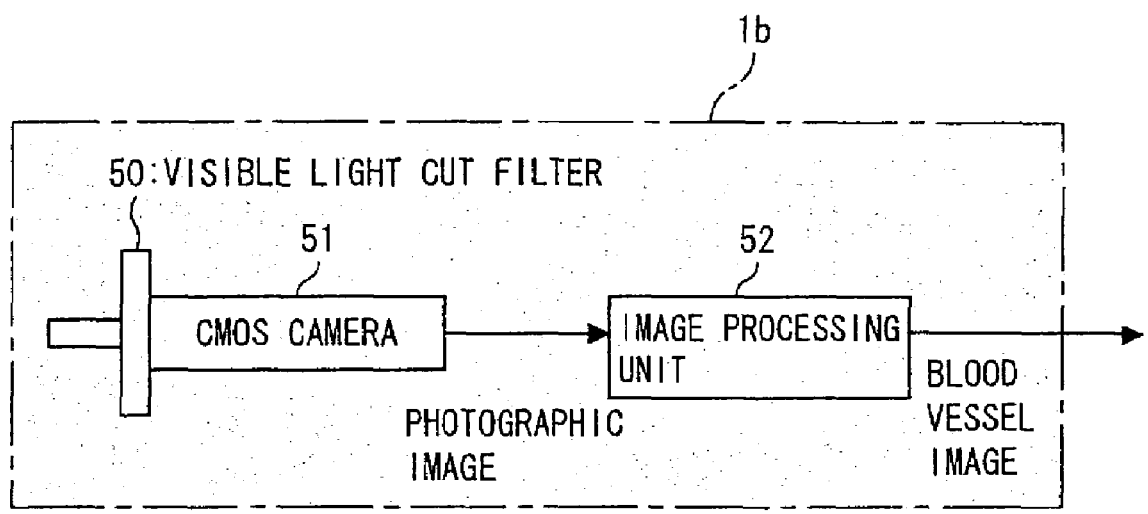
FIGS. 4(a) and 4(b) are diagrams showing an example of structure of a photographing unit according to the first embodiment of this invention.
Figure 4:
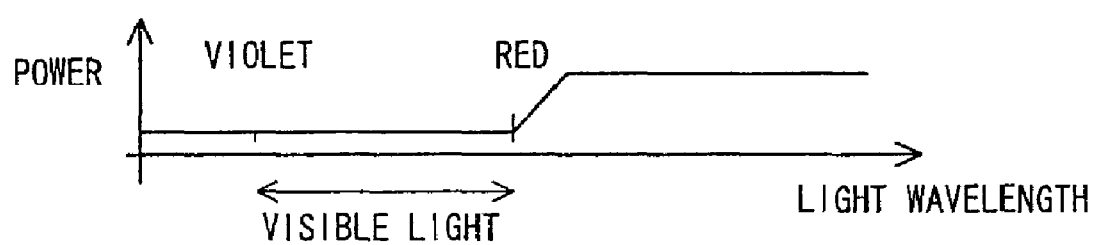

FIGS. 4(*a*) and 4(*b*) are diagrams showing an example of a structure of the photographing unit 1*b* according to the first embodiment of this invention. The photographing unit 1*b* shown in FIG. 4(*a*) comprises a visible light cut filter (hereinafter referred as a filter) 50 cutting off visible light, a CMOS (Complementary Metal Oxide Semiconductor) camera 51 having the filter 50 to photograph the palm of a hand, and an image processing unit 52 performing a binary coding process on a blood vessel image photographed by the CMOS camera 51. Characteristics of the filter 50 is to attenuate optical power in the visible light region, while transmitting light in the near-infrared light region. Particularly, it is preferable to attach the filter 50 to the CMOS camera 51 when using the filter 50.

Figure 5:
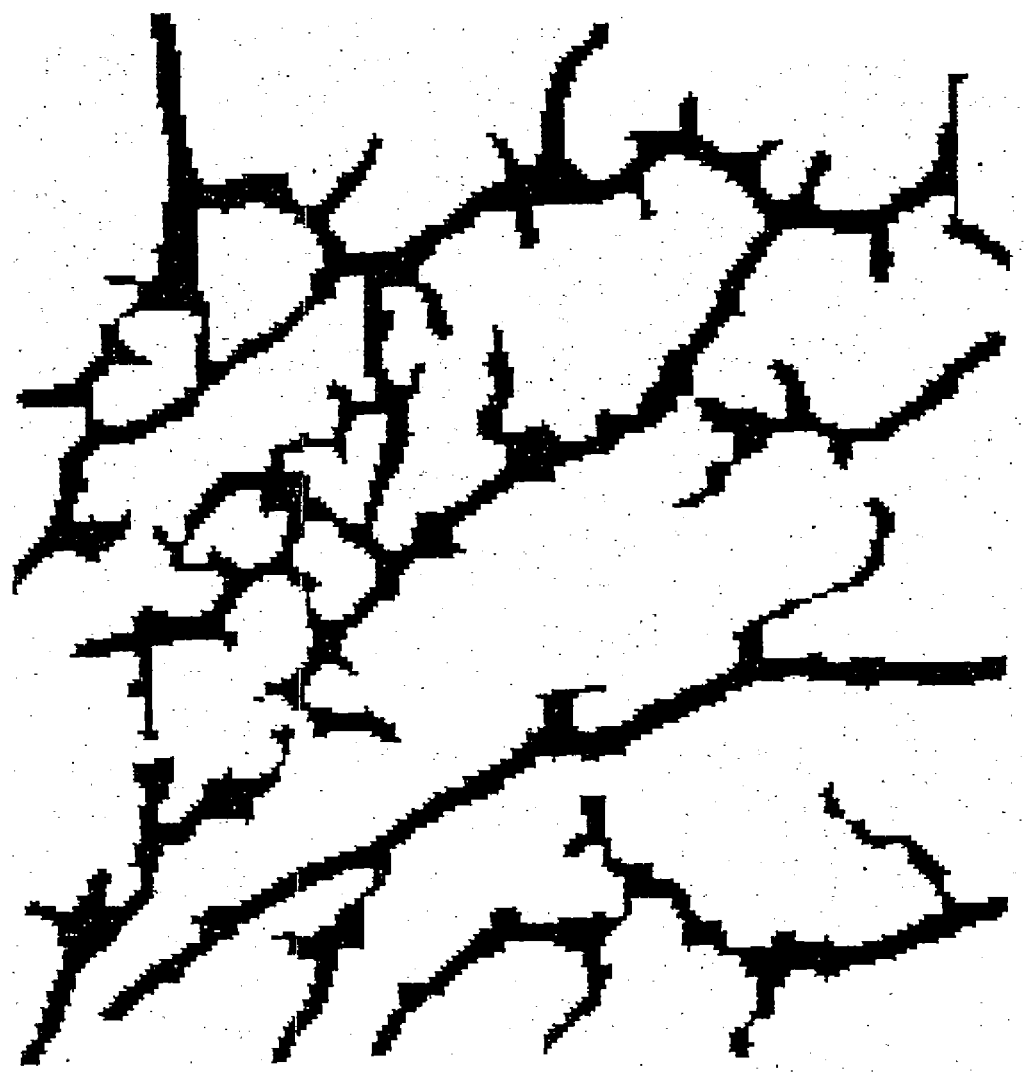
FIG. 5 is a diagram showing an example of blood vessel image according to the first embodiment of this invention.

FIG. 5 is a diagram showing an example of the blood vessel image according to the first embodiment of this invention. Blood vessels are displayed as dark images in an image of the palm of a hand photographed by the CMOS camera 51 (or a CCD [Charge Coupled Diode] camera). The photographing unit 1*b* of the computer 2 performs the binary coding process on the image, thereby extracting the blood vessel image.

The binary coding process function of the photographing unit 1*b* is accomplished by setting a pixel value to 1 when a value of the pixel is larger than a predetermined value, while setting the pixel value to 0 when not. The binary coding process function may be accomplished by an IC (or micro computer) disposed inside the mouse 1 as a part of the photographing unit 1*b*. Incidentally, the binary coding process may be performed according to a program held in the computer 2 as a pre-process of the verifying unit 2*a*.

The mouse 1 can easily extract a blood vessel image with pixel values in only the binary coding process, and can obtain a blood vessel image of a high quality. It is alternatively possible to hold a result of predetermined conversion of pixel values, not holding pixel values of a photographed image as they are. Still alternatively, it is possible to use parameters such as lightness, density, brightness, etc. of the image. Next, description will be made of a shape of the mouse 1.

Figure 6:
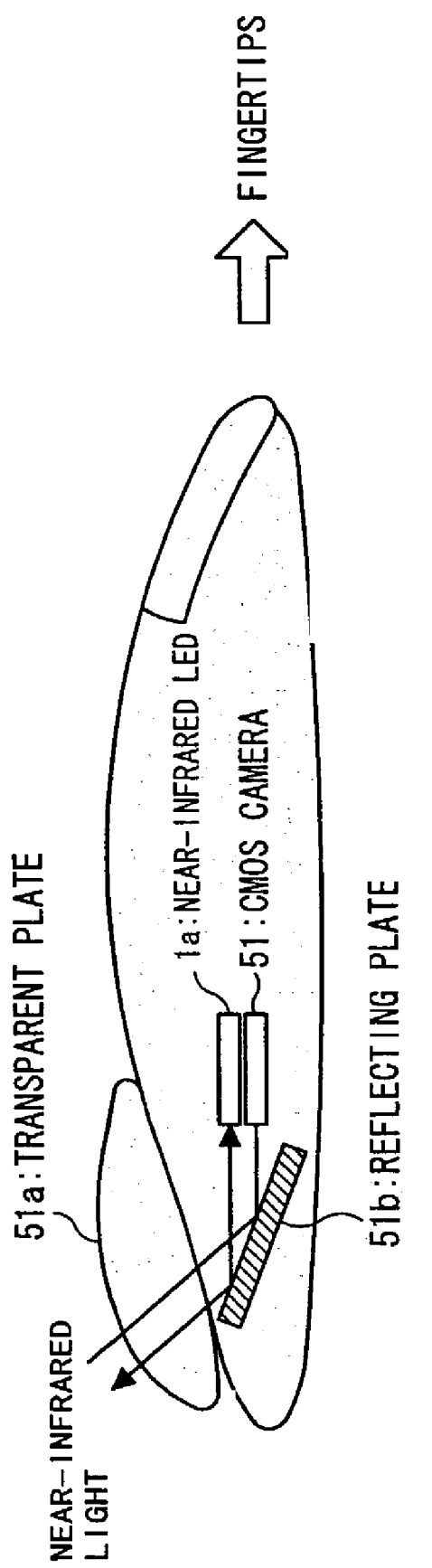
FIG. 6 is a diagram showing an example of the shape of a mouse according to the first embodiment of this invention.

FIG. 6 is a diagram showing an example of the shape of the mouse 1 according to the first embodiment of this invention. In FIG. 6, the tips of fingers position toward the right side. The mouse 1 shown in FIG. 6 comprises a transparent plate 51*a*, a reflecting plate (reflecting unit) 51*b*, the radiating unit (near-infrared LED) 1*a* and the CMOS camera 51.

The near-infrared LED 1*a* is an element outputting near-infrared light. A direction of the optical axis of the near-infrared light is desirably inclined rather toward the rear of the mouse 1 than the vertical direction so as to cross the palm of a hand at right angle.

The reflective plate 51*b* reflects the radiated light. Concretely, the reflective plate 51*b* reflects the near-infrared light from the near-infrared light LED 1*a* and returned light from the palm of the hand. The mouse 1 is provided with one or a plurality of reflective plates 51*b*. The reflective plate 51*b* is a mirror or a prism. Instead of the reflective plate 51*b*, a plurality of reflective members may be used, thereby to adjust the optical pass length to optimally adjust the focus of the CMOS camera 51. Incidentally, wide-angle lens may be used instead of the reflective plate 51*b*.

The transparent plate 51*a* transmits the near-infrared light reflected by the reflective plate 51*b*, while forming the upper surface of the mouse 1. In the mouse 1, there is no mechanical part of the mouse 1 in a portion on which the palm of the hand is placed. For this, when the photographing unit 1*b* is built in the mouse 1, the portion on which the palm of the hand is placed is replaced with a transparent material. As the shape of the transparent plate 51*a*, the thickness of the transparent plate 51*a* is gradually increased from the original thickness, so that the transparent plate 51*a* expands toward the outside of the mouse 1. Whereby, an area of a portion of the transparent plate 51*a* contacting with the palm of the hand is increased, which makes it possible to photograph a wide range of the palm of the hand.

As above, the mouse 1 is used as the operating device, the portion of the mouse 1 contacting with the palm of a hand is formed with a material permeable of the near-infrared light, and the portion contacting with the palm of the hand expands toward the outside of the mouse 1.

The CMOS camera 51 photographs returned light from the reflective plate 51*b*. The filter 50 for cutting off the visible light is provided on a surface of the CMOS camera 51 through which the light enters thereinto. Incidentally, a CCD camera may be used instead of the CMOS camera 51. The CMOS camera has advantages of lower cost and smaller size than the CCD camera.

The near-infrared light reflected by the reflective plate 51*b* is reflected or scattered by the palm of a hand placed on the transparent plate 51*a*, and the returned light is again transmitted through the transparent plate 51*a* and inputted to the CMOS camera 51.

Accordingly, a free space inside the mouse 1 can be used, and a distance between the near-infrared LED 1*a* and the palm of the hand is increased because the reflecting plate 51*b* is disposed, which allows a wide range to be photographed. Additionally, since the range to be photographed is increased, a spatial relationship between the palm of the hand and the mouse 1 can be stabilized, so that a blood vessel image can be stably obtained.

The operating device according to this embodiment is a GUI (Graphical User Interface) terminal equipped with a pointing device represented by the mouse 1 and/or the keyboard 7 (refer to FIG. 11), a television terminal equipped with a remote controller (remote control device), a portable information terminal such as a cellular phone 30 (refer to FIG. 12), or the like.

Hereinafter, the pointing device (not shown), the keyboard 7, the remote controller, the portable information terminal are collectively referred as operating device. Since the user has to hold the operating device when operating it, it is possible to detect at any time a physical characteristic with a less burden on the user by attaching a sensor that can photograph the hand to the operating device.

Further, it is possible to save a space to install the device as compared with a case where another measuring instrument is installed.

The storing unit 3 (refer to FIG. 1) stores a registration blood vessel image, holding one or a plurality of blood vessel images to be compared. The storing unit 3 comprises an IC card 3a and a card reading unit 3b. The IC card 3a stores a personal ID (Identification) and a blood vessel image, which are related with each other. The storing unit 3 stores a photographic blood vessel image using the IC card 3a.

The card reading unit 3b reads a personal ID and a blood vessel image stored in the IC card 3a, a card reader or the like being used as the card reading unit 3b.

The storing unit 3 may be a CD-R (CD-Recordable) or a CD-R/W (CD-Rewritable) which can be optically rewritten. Alternatively, the storing unit 3 may be configured with another storage medium such as a hard disk or the like.

The computer 2 carries out personal verification at a desired time on the basis of a photographic blood vessel image outputted from the mouse 1 and one or a plurality of registration blood vessel images beforehand stored. The computer 2 comprises a verifying unit 2a and an information processing unit (processing unit) 2b. The verifying unit 2a collates a photographic blood vessel image photographed by the photographing unit 1b with a registration blood vessel image stored in the storing unit 3 at a desired time to carry out personal verification. Incidentally, the personal verification process will be described in detail later. The computer 2 is connected to the mouse 1 and the storing unit 3 with cables.

The information processing unit 2b performs a communication procedure process of the information communication system 100 requiring personal verification. The computer (personal verification unit) 2 decides a time for verification according to a notice from the information processing unit 2b. The verifying unit 2a decides a time for verification according to a notice from the mouse 1. Concretely, the information processing unit 2b connects to the host computer using a communication procedure to transmit a result of personal verification, and disconnects the communication with the host computer 102a according to a notice from the verifying unit 2a.

The information processing unit 2b performs a drawing process of a communication process screen necessary for electronic commerce. When interrupting the process for electronic commerce, the information processing unit 2b displays a warning message such as "unauthorized use" or the like on a display (display unit) 4 displaying the screen.

Next, the personal verification process will be described in detail.

A process procedure (X1) through (X5) of the verifying unit 2a to be performed in authentication is as follows:

(X1) Input of an ID

The verifying unit 2a inputs a personal ID designated by the IC card 3a or a password. When the verifying unit 2a repetitively carries out authentication of the same personal ID, inputting of the personal ID can be omitted.

(X2) Obtain a Registration Blood Vessel Image

The verifying unit 2a obtains a registration blood vessel image designated by the inputted personal ID from the storing unit 3. When repetitively carrying out the authentication, the verifying unit 2a may store a registration blood vessel image obtained last time and use it.

(X3) Obtain a Photographic Blood Vessel Image

The verifying unit 2a obtains a photographed blood vessel image from the photographing unit 1b.

(X4) Calculate Similarity

The verifying unit 2a calculates similarity. Similarity signifies a quantity representing how much the registration blood vessel image and the photographic blood vessel image agree, which will be described later with reference to FIGS. 7(a) and 7(b).

(X5) Determination

The verifying unit 2a determines that the authentication is successful when the similarity is larger than a predetermined threshold value, and that the user having the photographic blood vessel image is a person (a person himself/herself) represented by the personal ID. When not, the verifying unit 2a determines that the authentication is unsuccessful, thus that the user is another person.

Processing procedure (Y1) through (Y4) to be performed by the verifying unit 2a in identification is as follows:

(Y1) Obtain a Registration Blood Vessel Image

The verifying unit 2a obtains blood vessel images of a plurality of users registered in the storing unit 3. When repetitively carrying out identification, the verifying unit 2a may store registration blood vessel images obtained in the last identification, and can use them.

(Y2) Obtain a Photographic Blood Vessel Image

The verifying unit 2a obtains a photographic blood vessel image from the photographing unit 1b.

(Y3) Calculate Similarity

The verifying unit 2a calculates similarity representing a quantity representing how much a registration blood vessel image agrees with the photographic blood vessel image for each user.

(Y4) Determination

The verifying unit 2a selects a user having the greatest similarity. When the maximum value of the similarity is smaller than a predetermined threshold value, the verifying unit 2a determines that there is no corresponding person (no registered person). When not, the verifying unit 2a determines that the user is the selected person having the maximum similarity.

Next, a method of calculating the similarity will be described with reference to FIGS. 7(a) and 7(b).

FIGS. 7(a) and 7(b) are diagrams for illustrating a method of calculating the similarity according to the first embodiment of this invention. Images N1 and N2 shown in FIGS. 7(a) and 7(b), respectively, are a photographic blood vessel image and a registration blood vessel image, respectively. Each of these images N1 and N2 is simplified for the sake of illustration, consisting of 25 pixels obtained by dividing each of the length and width of the image into five. Each of the pixels has a pixel value represented by intensity (lightness) of the light. Since the personal verification apparatus 10 uses monochromatic images, the pixels can hold values from 0 to 255, but the values are classified into two values of 0 and 255 among the values of 0 to 255 in the binary-coding process by the photographing unit 1b. For example, a pixel value in the zeroth row and third column of the photographed blood vessel image N1 shown in FIG. 7(a) is "255" (white). Incidentally, a pixel in the i-th row and j-th column (i and j being natural numbers from zero to four) is referred as a focused pixel (i, j). An image photographed at a plurality of wavelengths may be used, instead of a monochromatic image. In which case, each pixel has a pixel value representing the intensity of light at each wavelength, and the similarity is calculated from a plurality of the pixel values.

In a method of calculating the similarity, 25 pixel values of the photographic blood vessel image are compared with 25 pixel values of the registration blood vessel image, respectively. When the pixel values of the both images agree, the counter is incremented. When the pixel values disagree, the counter is not operated. This calculating method will be next described in detail.

(Z1) Initialization

The verifying unit 2a sets the focused pixel (i, j) for both of the photographic blood vessel image N1 and the registration blood vessel image N2 (hereinafter also referred as both blood vessel images) to a pixel at the top left-hand corner (0, 0) of the images, and initializes a variable (counter) holding the number of agreeing pixels to zero.

(Z2) Compare Pixel Values

The verifying unit 2a obtains pixel values of the two images (both blood vessel images) at the focused pixel (i, j), and compares them. The pixel values of the both blood vessel images are both 255 at the focused pixels (0, 0), thus a matching occurs. The verifying unit 2a increments the counter value by one.

(Z3) Move the Focused Pixel (i, j)

The verifying unit 2a moves the focused pixel (i, j) to the right by one. Next, pixel values at the focused pixel (0, 1) of the both blood vessel images are compared, then pixel values at the focused pixel (0, 2) of the both blood vessel images are compared. The counter value is incremented by 2, thus becoming 3. Pixel values at the focused pixel (0, 3) disagree, so that the counter value remains 3. Then, pixel values at the focused pixel (0, 4) are compared, and the counter value is incremented, thus becoming 4.

When reaching the rightmost, the focused pixel (i, j) moves to a position at the leftmost in the next row (1, 0). After that, when the focused pixel (i, j) reaches a position (4, 4) and pixel values thereat are compared, movement of the focused pixel (i, j) is terminated. This function is accomplished by "FOR loop" of the program, for example.

(Z4) Repetition

The verifying unit 2a again compares pixel values.

(Z5) Output Similarity

The verifying unit 2a assumes an obtained count value as a value of the similarity.

As above, the process is easy because pixels of the photographic blood vessel image and the registration blood vessel image are simply compared. However, a value of the similarity obtained in the above similarity calculating method is affected by a position or a direction of a hand when the user places his/her hand. This effect can be reduced by improving the similarity calculating method.

In the above example, binary-valued images are used as blood vessel images. In order to decrease the storage capacity or increase the speed of the verification process, the verifying unit 2a may perform the above similarity calculating method in a way that the verifying unit 2a extracts characteristic quantities from the images, store the extracted characteristic quantities and compare them. This calculating method using characteristic quantities extracts characteristic points such as end, bifurcation and the like, and uses positions of these characteristic points. Note that this invention does not concern with details of the mode of expression of blood vessel images, or the method of comparing the same.

Figure 8:
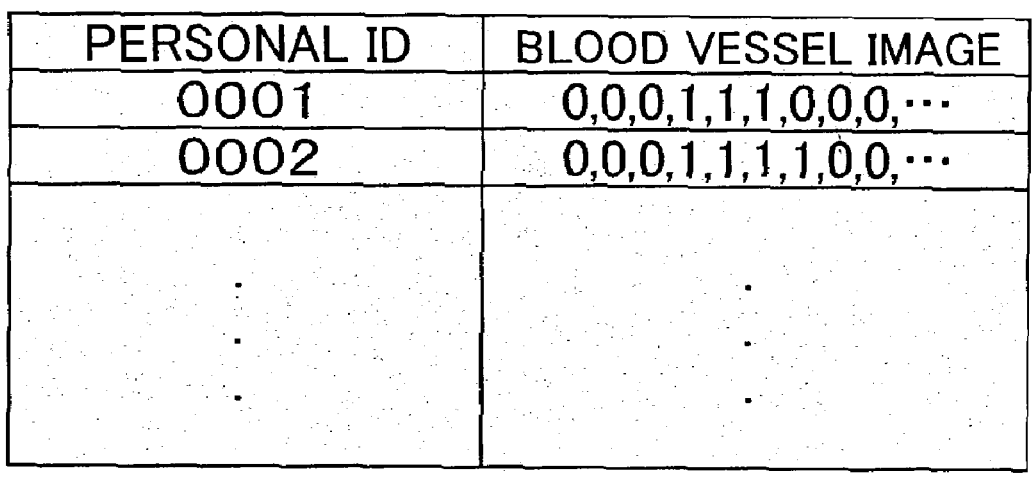
FIG. 8 is a diagram showing a form of data to be stored in a database to be stored according to the first embodiment of this invention.

The storing unit 3 shown in FIG. 1 stores registration blood vessel images, relating personal IDs with the blood vessel images, respectively, and storing them. With respect to each of the blood vessel images, pixel values of the image representing the blood vessel image, positions of characteristic points, etc. are converted into a sequence of digits, and stored according to a predetermined rule. The storing unit 3 is typically accomplished inside the computer 2 as a database in a data form show in FIG. 8.

Process procedure (W1) through (W3) in the blood vessel image registration processing method according to this invention is as follows:

(W1) Input an ID

The verifying unit 2a accepts a personal ID designated by the IC card 3a or a password. When the personal ID is beforehand determined, the verifying unit 2a can omit inputting of the ID.

(W2) Obtain a Photographic Blood Vessel Image

The verifying unit 2a obtains a photographic blood vessel image from the photographing unit 1b.

(W3) Register the Blood Vessel Image

The verifying unit 2a registers the personal ID and the photographic blood vessel image in the storing unit 3.

As above, the process of registering a registration blood vessel image is relatively easy.

Accordingly, it is possible to reduce a burden on the user, and carry out personal verification at any time and in a saved space.

Next, description will be made of the personal verification apparatus 10 in the information communication system 100 with the above structure according to the first embodiment of this invention with reference to FIG. 9.

Figure 9:
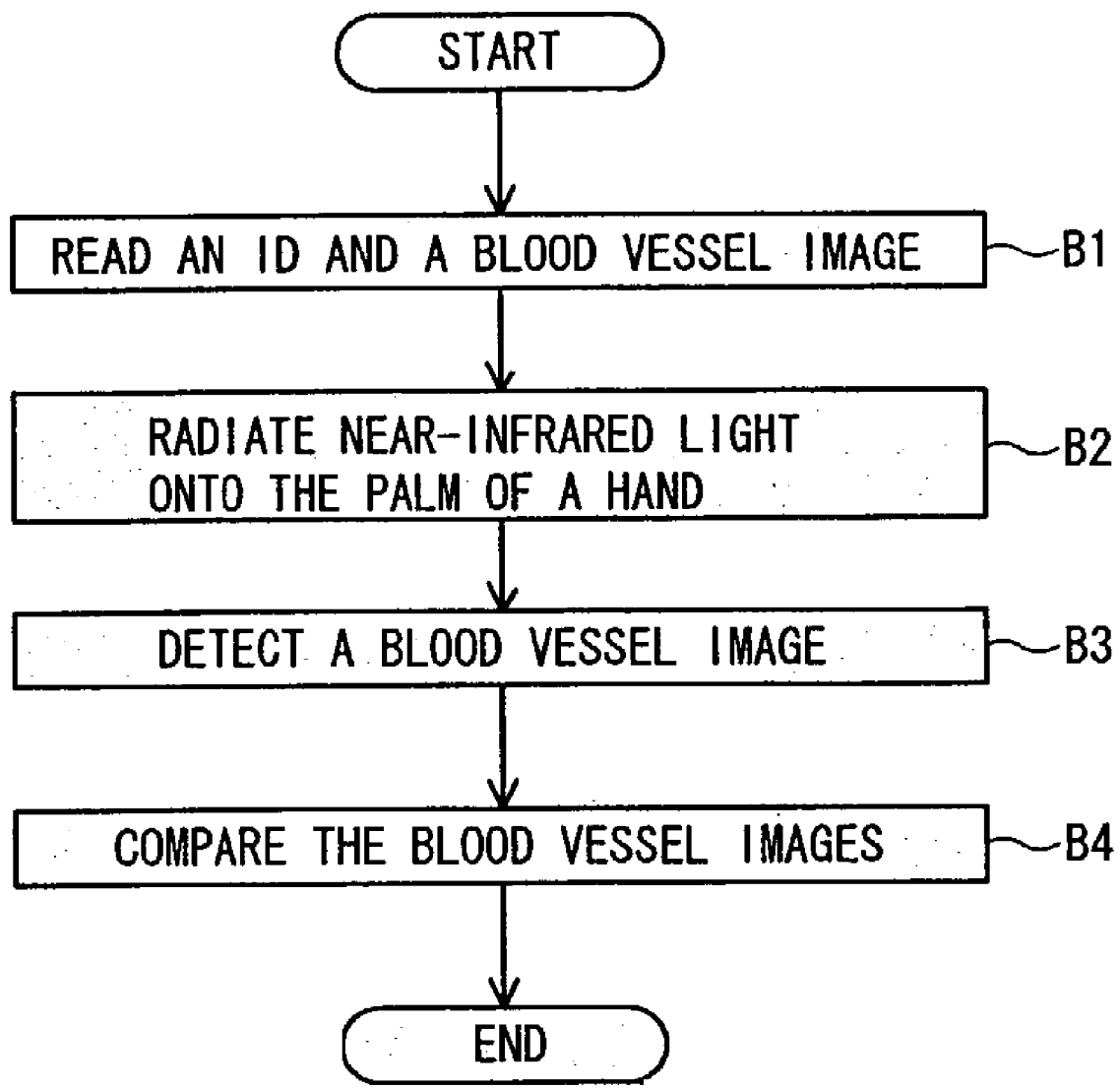
FIG. 9 is a flowchart for illustrating a personal verification process according to the first embodiment of this invention.

FIG. 9 is a flowchart for illustrating a personal verification process according to the first embodiment of this invention. The card reading unit 3b reads a personal ID and a blood vessel image stored in the IC card 3a (step B1). The near-infrared LED 1a radiates near-infrared light onto the palm of a hand of the user (step B2). The photographing unit 1b extracts a blood vessel image (step B3). The verifying unit 2a compares the read blood vessel image with the photographic blood vessel image, and determines whether the user is the person himself/herself (step B4).

In normal operation, the user presents the IC card 3a or the like, in which the personal ID and the blood vessel image are stored, to the card reading unit 3b such as a card reader or the like. The user then grasps the mouse 1 having the photographing function, and starts a necessary operation for electronic commerce. The click detecting unit 1c and the movement detecting unit 1d provided in the mouse 1 cooperate with each other to detect the operation by the user.

The near-infrared LED 1a radiates near-infrared light onto the palm of the hand of the user while the user operates, and the photographing unit 1b extracts a photographic blood vessel image. The photographic blood vessel image is transmitted to the computer 2 through the cable. The information processing unit 2b in the computer 2 performs a communication processing screen drawing process necessary for the electronic commerce. At the same time, the verifying unit 2a determines whether the user is an unrightful owner of the IC card 3a or not. When determining that the user is an unrightful user, the verifying unit 2a notifies the information processing unit 2b of it to interrupt the process for the electronic commerce. The information processing unit 2b disconnects a communication with the host computer 102a, and displays a warning message on the display (display unit) 4.

(A1) Description of First Modification

Next description will be made of a time (timing) to carry out photographing and verification in a mode where the personal verification apparatus 10 is used in electronic commerce. In a practical information communication system 100, various choices are possible as to when the personal verification apparatus 10 photographs and carries out personal verification. For this, a time (timing) to carry out personal verification can be selected from among (P1) through (P4) below.

(P1) When the information communication system 100 is started to be used, or when the information communication system 100 admits the necessity for it, for example, when the user decides to purchase a product in electronic commerce.

(P2) At predetermined time intervals, or when the button is pressed down, which is decided by the mouse 1. Whereby, it is assured that the user uses the mouse 1.

(P3) When it is determined that a photographic blood vessel image is valid (which will be described later in detail).

(P4) It is possible to combine the above choices, and use them. For example, verification is carried out when the information communication system admits that verification is necessary, but a result of verification obtained last time is continuously used until a predetermined time elapsed from the time of the last verification.

With respect to a time (timing) to photograph, photographing is carried out at only when verification is done, or photographing is carried out at any time. In the case where the photographing is carried out only when verification is done, there is a possibility that only one blood vessel image obtained in photographing is not sufficient for verification. Accordingly, it is desirable to photograph a sufficient number of blood vessel images (or in number judged as sufficient by an image determining unit to be described later).

Figure 10:
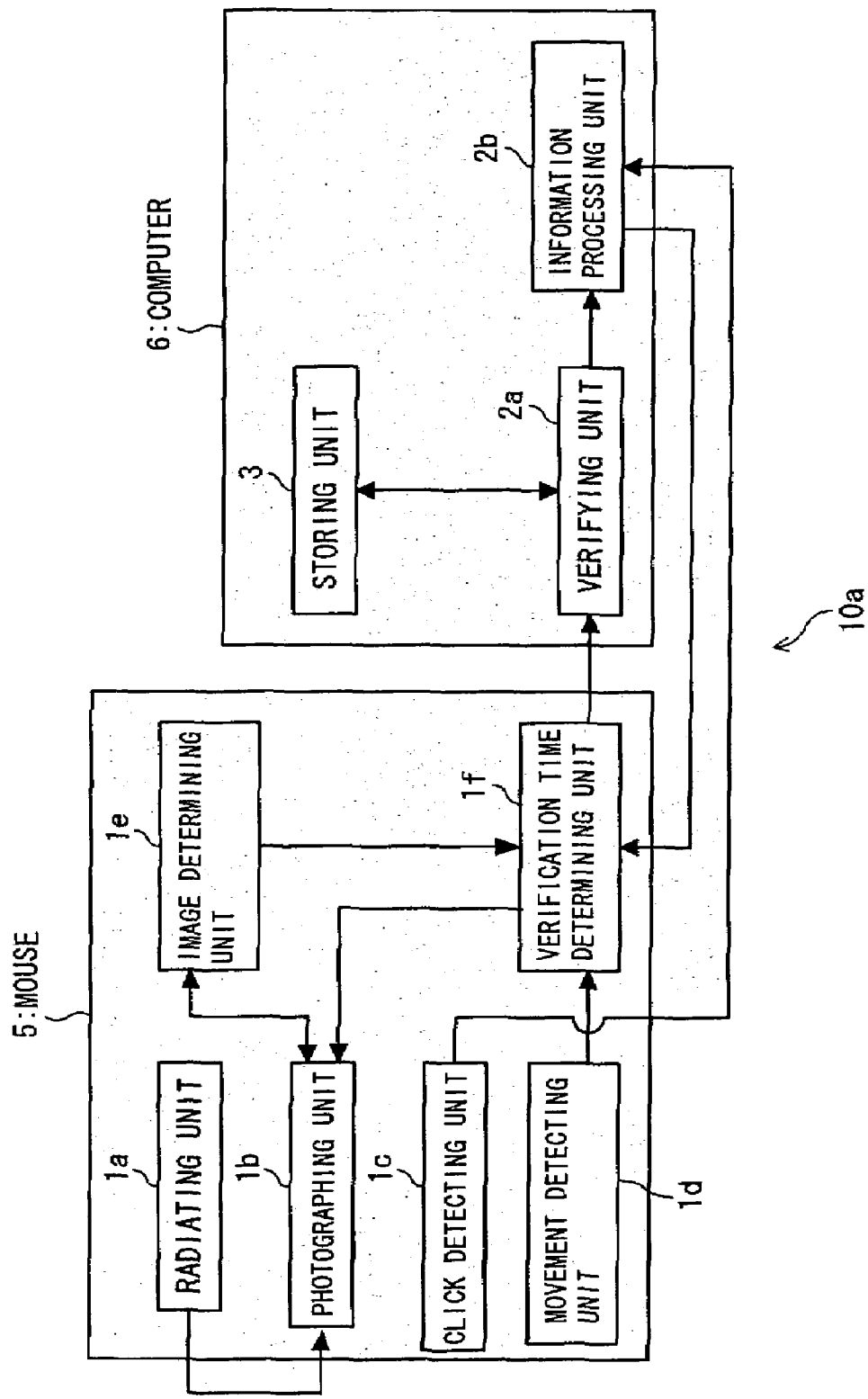
FIG. 10 is a block diagram of a processor with a personal verification function according to a first modification of the first embodiment of this invention.

FIG. 10 is a block diagram of a personal verification apparatus according to a first modification of the first embodiment of this invention. A mouse 5 provided to the personal verification apparatus 10a shown in FIG. 10 has a function of being able to carry out personal verification at a desired time, addition to the functions that the mouse 1 has. The mouse 5 comprises the image determining unit (determining unit) 1e and a verification time deciding unit 1f.

The verification time determining unit 1f decides a time to verify, deciding a time (timing) to photograph and a time (timing) to verify.

The image determining unit 1e determines the validity of a photographic blood vessel image as to whether it is suitable for collation. The verifying unit 2a uses one of a plurality of photographed blood vessel images which is judged by the image judging unit as valid, and performs collation with it. Incidentally, the validity signifies that the photographic blood vessel image can be an object of personal verification (authentication or identification) or that highly accurate determination is possible with it.

The image determining unit 1e determines a photographed image before undergone the binary-coding process, and makes determination with the pixel values. The image determining unit 1e determines whether the photographic blood vessel image is a blood vessel image on the basis of the pixel values of the photographic blood vessel image photographed by the photographing unit 1b, thereby determining the above validity. Incidentally, the image determining unit 1e determines the above validity on the basis of a change with time of the photographic blood vessel images photographed by the photographing unit 1b.

When determining that the photographic blood vessel image is not valid, the image determining unit 1e stops the operation of the information communication system 100, and outputs a warning. When visible light is contained in a part of the photographic blood vessel image photographed by the photographing unit 1b, the image determining unit 1e determines the above validity on the basis of an intensity or a change with time of the visible light.

A computer 6 shown in FIG. 6 is almost the same as the computer 2, which comprises a storing unit 3, a verifying unit 2a and an information processing unit 2b. The storing unit 3 may be configured with various devices.

For example, the storing unit 3 may be an optically rewritable CD-R, CD-R/W disc, harddisk, etc, other than a memory. If a communication path between the computer and an external apparatus is established, there is no need to provide the storing unit 3 in the computer 6.

In FIG. 10, like reference characters designate like or corresponding parts described above, thus further descriptions of which are omitted.

The personal verification apparatus 10a according to this invention comprises a mouse having a near-infrared LED 1a radiating near-infrared light onto the palm of a hand and a photographing unit 1b photographing a photographic blood vessel image with reflected light from the palm of the hand, the storing unit 3 storing a registration blood vessel image, and a verifying unit 2a collating the photographic blood vessel image photographed by the photographing unit 1b with the registration blood vessel image stored in the storing unit 3 to carry out personal verification.

In FIG. 10, the verifying unit 2a determines a time for verification according to a notice from the information processing unit 2b performing a communication procedure process of the information communication system 100 requiring personal verification. The verifying unit 2a performs collation with one of a plurality of photographed images determined by an image determining unit 1e that it is valid.

When the information communication system 100 admits necessity for personal verification, it is notified from the information processing unit 2b, as above. When the mouse 1 determines necessity for personal verification, it is notified from a click detecting unit 1c or a movement detecting unit 1d. When it is determined that a photographic blood vessel image is valid, it is notified from an image determining unit 1e to be described later.

Next description will be made of a method of determining by the image determining unit 1e whether a photographic blood vessel image is valid.

Even when the user uses the information communication system 100, the palm of a hand of the user cannot be always photographed. If the user moves off his/her hand even a little, there is a possibility that the hand might go out of the visual field of the photographing unit 1b. For this, there is a possibility that a rightful user is judged as an unrightful user. To prevent this erroneous determination, three methods are provided.

(1-1) The image determining unit 1e determines whether a photographed image represents a blood vessel image or not. A verification time determining unit 1f notifies the verifying unit 2a that the verifying unit 2a has to do personal verification only when the verifying unit 2a determines that the photographic image is a blood vessel image.

Here, determination as to whether the photographed image is a blood vessel image or not is performed by examining whether an average value of pixel values of a photographed image falls within a desired range or not. The range of pixels is set to be within twice the standard deviation on the basis of an average pixel value (an average value of values obtained by photographing the same blood vessels ten times, for example) of photographic images beforehand photographed, for example. When it is determined that the photographed image is not a blood vessel image, it is desirable that the verifying unit 2a notifies the information communication system 100 of it, displays a warning such as "please place the hand" or the like on a display 4, and temporarily stops the operation of the information communication system 100.

(1-2) The image determining unit 1e examines a change with time of photographed images, and the verification time determining unit 1f notifies the verification unit 2a that the verification unit 2a has to carry out personal verification only when the image determining unit 1e determines that there is a change. A change with time is determined in a way that an image photographed a predetermined time ago is held, a difference between the photographic image photographed ago and a photographic image currently photographed is calculated for each pixel, and it is determined whether an average of absolute values of the differences is larger than a designated value or not. When the personal verification is unsuccessful, it is desirable that the image determining unit 1e notifies the information communication system 100 of it, and displays a warning such as "please place your hand" or the like on the display 4. When the personal verification is successively unsuccessful several times, it is desirable to stop the operation of the information communication system 100.

(1-3) The apparatus 10a is provided with a photographing unit 1b which can detect visible light in a part of a photographed image. The image determining unit 1e examines the intensity of the visible light. The verification time determining unit 1f notifies the verifying unit 2a that the verifying unit 2a has to carry out personal verification only when the photographed image is in a dark state or when the photographed image shifts to a darker direction with respect to time.

When determining that the photographed image is in a dark state, the image determining unit 1e makes determination according to whether an average value of pixel values representing the intensity of the visible light is smaller than a desirable value or not, for example. When determining whether the photographic image shifts to a darker direction with respect to time, the image determining unit 1e holds a photographic image photographed predetermined time ago, calculates an average value of differences between pixel values of pixels representing the intensity of the visible light, and makes determination according to whether the average value is smaller than a designated value or not, for example. The photographing unit 1b which can detect visible light in a part of a photographed image may be accomplished by replacing a visible light cut filter with an infrared ray cut filter in a part of the visual field of the camera, for example.

(A2) Description of Second Modification

A second modification relates to a method of improving the accuracy of personal verification. In order to improve the accuracy, here are provided a mode in which a keyboard, a portable telephone or the like is used as the operating device, and a mode in which a plurality of photographing cameras are built in the operation device.

(1) Mode in which a keyboard is used as the operating device (1-1) Structure of the Apparatus Blood vessels of a hand have sparser information than fingerprints. For high-accurate personal verification, the photographing unit 1b is required to photograph a relatively wide area stably.

Figure 11:
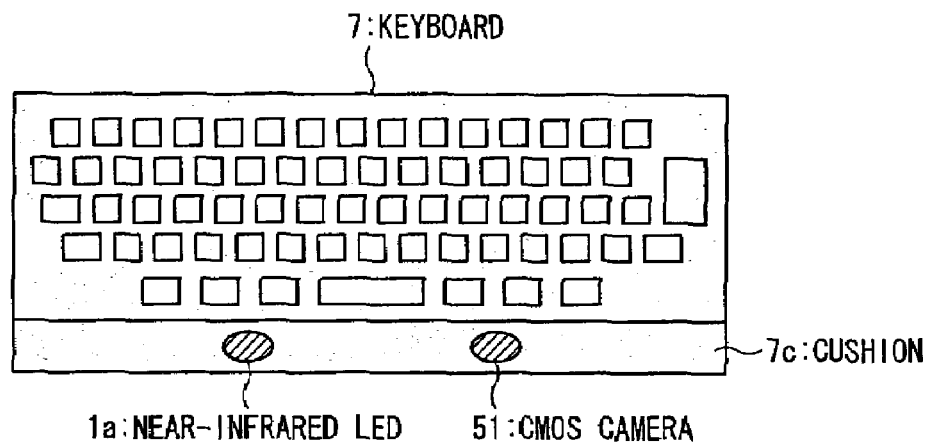
FIG. 11 a diagram showing a shape of a keyboard according to a second modification of the first embodiment of this invention.

FIG. 11 is a diagram showing a shape of a keyboard according to the second modification of the first embodiment of this invention. A keyboard 7 shown in FIG. 11 is an operating device for inputting, used by a user to access to the computer 6 or the host computer 102a. The keyboard 7 has a function of operating input/output of the computer 6, and a function of photographing the palm of a hand, including a near-infrared LED 1a, a CMOS camera 51, a cushion (shock absorbing material) 7c. In FIG. 11, like reference characters designate like or corresponding parts described above.

In the personal verification apparatus 10a according to this invention, the keyboard 7 is used as the operating device, and the near-infrared LED 1a and the photographing unit 1b are disposed in proximity to a side of the keyboard where the hands are placed. The cushion 7c has an appearance of a thin plate disposed at a position where the lower parts of the palms of hands of the user contact therewith.

(1-2) Structure in Which a Plurality of Photographing Cameras are Built

Inside the cushion 7c, plural sets of the near-infrared LED 1a and the photographing unit 1b (CMOS camera 51 or the like) are disposed, whereby a wide range can be stably photographed.

(2) Description of Operation

With the above structure, it is possible to selectively use three processing methods for an image photographed by a plurality of cameras.

(2-1) A plurality of images are combined, and the user handles them as one large image. It is thereby possible to share the verifying unit 21 with an apparatus (for example, of a mouse-integrated type) having only one CMOS camera 51.

(2-2) The image determining unit 1e determines whether photographed blood vessel images are valid or not, and carries out verification with only a photographed blood vessel image judged as valid. When the CMOS camera 51 is built in the mouse 1 as well, the judgement is made with both of the CMOS cameras 51, thereby to provide stable verification.

(2-3) The verifying unit 2a puts together results of verification of a plurality of photographed blood vessel images, and collates. When all of the plural photographed blood vessel images indicate determined that the user is the person himself/herself, the user is judged as the person himself/herself, for example. Alternatively, when at least one photographic blood vessel image indicates that the user is the person himself/herself, the user is judged as the person himself/herself. Incidentally, it is possible to use only a photographic blood vessel image judged as valid by the image judging unit 1e.

The photographing camera may be provided to both the keyboard 7 and the mouse 1, whereby highly accurate personal verification becomes possible.

(3) Mode in Which a Cellular Phone or the Like is Used as the Operating Device (3-1) Structure of the Apparatus Unlike the mouse 1, various electronic parts are mounted at a high density in a remote controller of a television terminal or a portable device (for example, a cellular phone or the like). For this, it is difficult to photograph a wide range of the palm of a hand by one CMOS camera 51 because the electronic parts obstruct it.

Figure 12:
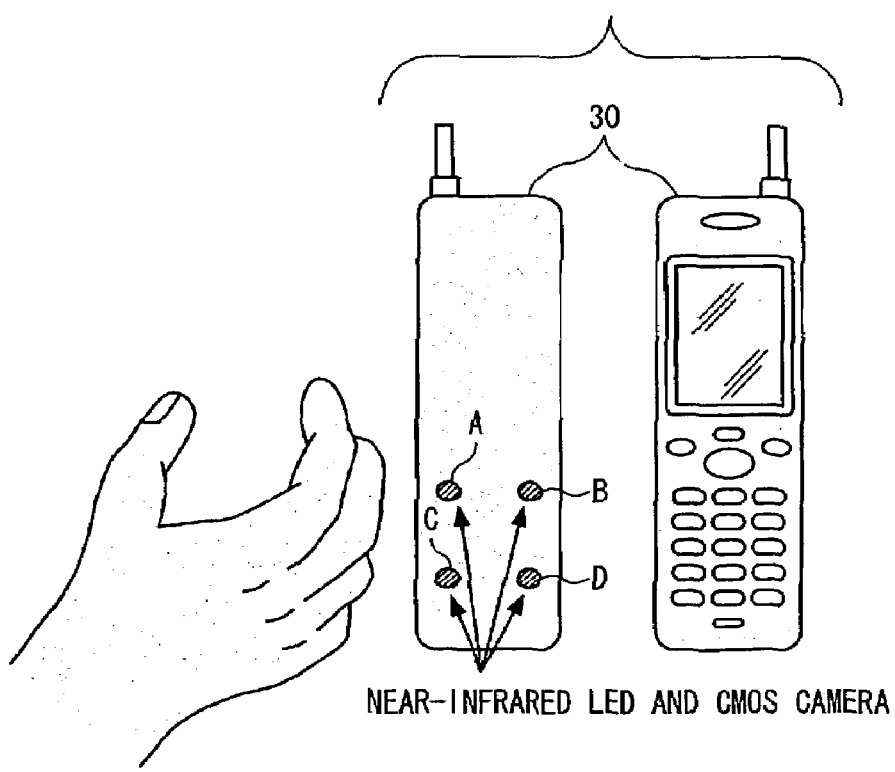
FIG. 12 is an external view of a processor with a personal verification function according to the second modification of the first embodiment of this invention.

(3-2) Mode in Which a Plurality of Photographing Cameras are Built in a Cellular Phone Accordingly, it is desirable to integrate a plurality of small-sized, low-resolution CMOS cameras 51 in a cellular phone to photograph a wide range. FIG. 12 shows an example where cameras for photographing (not shown) are arranged on a cellular phone.

FIG. 12 is a diagram of an external view of the personal verification apparatus according to the second modification of the first embodiment of this invention. On the back (refer to the left side) of a processing apparatus (apparatus of a cellular-phone-integrated type; hereinafter referred as a cellular phone 30) with a personal verification function shown in FIG. 12, made are four transmitting openings A, B, C and D made from a material permeable of near-infrared light. Under each of the four transmitting openings A through D inside the portable telephone 30, installed are near-infrared LEDs 1a being able to radiate near-infrared light onto the palm of a hand from the inside of the cellular phone 30, and photographing cameras being able to photograph reflected light of the near-infrared light reflected by the palm of the hand, although not shown.

Positions at which the plural transmitting openings A through D are made are in the lower half of the cellular phone 30. When the user holds the cellular phone 30 in his/her right or left hand, the palm of the hand covers the plural transmitting openings A through D, and the near infrared light from the near-infrared LEDs 1a is reflected by the palm of the hand. Accordingly, it is possible to obtain a photographic blood vessel image in a wider range as compared with a range obtained by only single set of the near infrared LED 1a and the photographing camera.

Figure 13:
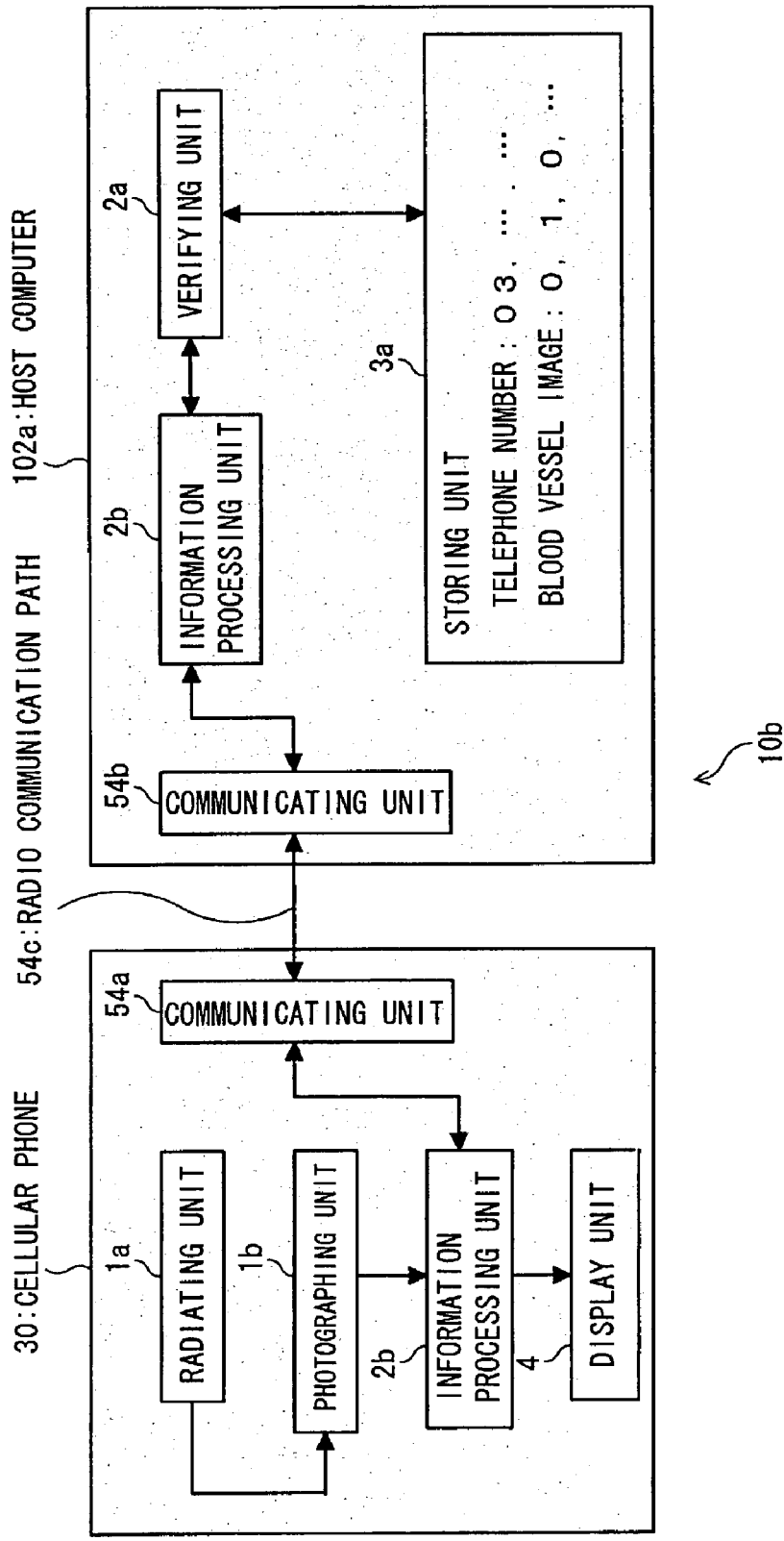
FIG. 13 is a block diagram of a processor with a personal verification function according to the second modification of the first embodiment of this invention.

FIG. 13 is a block diagram of the personal verification apparatus according to the second modification of the first embodiment of this invention. The personal verification apparatus 10b shown in FIG. 13 has a function possessed by the personal verification apparatus 10 and a function of communicating with the host computer 102a using the cellular phone 30. The personal verification apparatus 10a comprises the cellular phone 30 and the host computer 102a. The cellular phone 30 comprises the near-infrared LED 1a, the photographing unit 1b, an information processing unit 2b, a display (display unit) 4 and a communicating unit 54a. The communicating unit 54a is provided in the cellular phone 30 to communicate in radio with the host computer 102a over a radio communication path 54c. The communicating unit 54a comprises a radio frequency circuit, a transmitting/receiving antenna, etc., although not shown. The radio communication path 54c is for radio signals. A communicating unit 54b is provided in the host computer 102a to transmit/receive radio signal to/from an opposite cellular phone (not shown) over the radio communication path 54c.

The personal verification apparatus 10b carries out personal verification of a user who is using the cellular phone 30. The host computer 102a allows the user to access for electronic commerce, for example.

(4) Description of Operation

With the above structure, the personal verification apparatus 10b processes.

Figure 14:
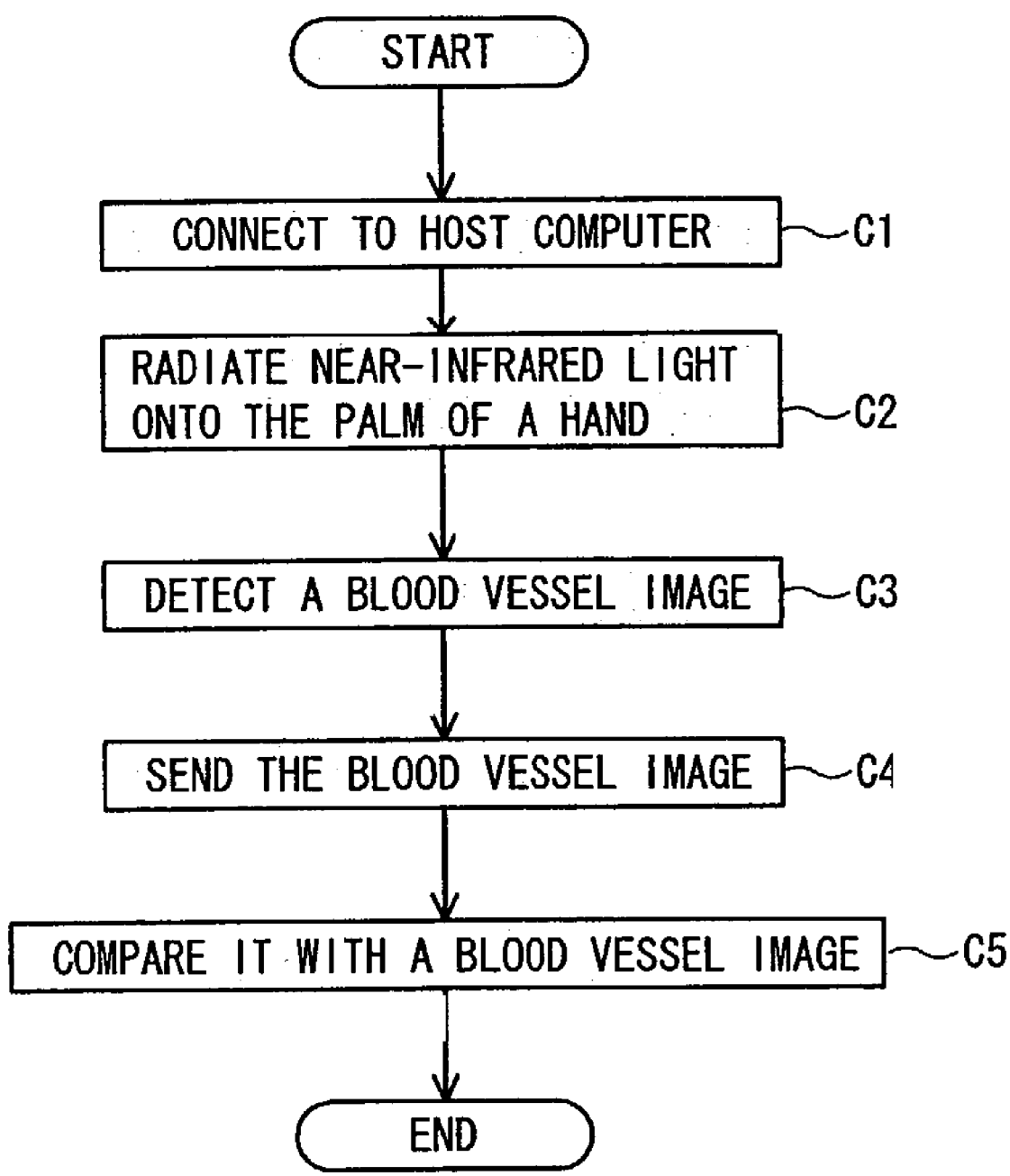
FIG. 14 is a flowchart for illustrating a process by the processor with a personal verification function according to the modification of the first embodiment of this invention.

FIG. 14 is a flowchart for illustrating a process by the personal verification apparatus 10b according to the modification of the first embodiment of this invention.

The information processing unit 2b of the cellular phone 30 is connected to the host computer 102a via the communicating unit 54a over the radio communication path 54c (step C1). The near-infrared LED 1a radiates near-infrared light on the palm of a hand of the user (step C2). The photographing unit 1b extracts a blood vessel image (step C3). The information processing unit 2b sends the blood vessel image to the host computer 102 over the radio communication path 54c according to the communication procedure (step C4). The verifying unit 2a of the host computer 102a retrieves a blood vessel image from the storing unit 3 with a telephone number connected as a personal ID, compares the photographed blood vessel image with the retrieved blood vessel image, and determines whether the user is the person himself/herself (step C5).

The photographing unit 1b is built in the operating device such as the mouse 1, the keyboard 7, or the like, whereby it is possible to decrease the burden on the user and provide the personal verification unit 2a operating at any time in a saved space.

While the user uses the cellular phone 30, a blood vessel image of the palm of a hand of the user is, at any time or periodically, photographed by plural sets of the near-infrared LED 1b and the CMOS camera 51, whereby personal verification of the user becomes continuously possible. Processing on the image photographed by the plural CMOS cameras 51 is performed in the same manner as is performed with the keyboard 7, so that the same effects can be provided as those provided when the keyboard 7 is used.

Additionally, an area on the back surface of the cellular phone 30, with which the palm of the hand contacts, can be increased. Like the example employing the transparent plate 51a of the mouse 1 described above, the cellular phone 30 can carry out high-accurate personal verification. Since the palm of a hand of the user keeps contacting with the cellular phone at least while the user calls, high-accurate personal verification becomes possible without placing a burden on the user.

(5) Mode in Which a Portable Terminal of a Wrist Watch Type is Used as the Operating Device With a decrease in size of the portable terminals, there has been developed a portable terminal of a wrist watch type having a computer function along with a watch function. This portable terminal of a wrist watch type functions as a personal verification apparatus.

This personal verification apparatus comprises a main body equipment having a near-infrared LED 1a radiating near-infrared light onto a part of a body, a photographing unit 1b photographing a photographic blood vessel image with reflected light from the part of the body, a storing unit 3 storing a registration blood vessel image, and a verifying unit 2a collating a photographic blood vessel image photographed by the photographing unit 1b with the registration blood vessel image stored in the storing unit 3 to carry out personal verification.

Like a wrist band, the portable terminal of a wrist watch type is always wound around a wrist of the user. Like the palm of a hand, a blood vessel image of a wrist can be detected with near-infrared light, so that this invention can be applied to an operating device to be wound around a wrist such as a cellular phone of a wrist watch type. Additionally, each member for the above personal verification, which has been reduced in size, can be built in a portable terminal of a wrist watch type.

With the above structure, it is possible to successively transmit a blood vessel image of a wrist photographed by the portable terminal of a wrist watch type to the computer 6 or the host computer 102a, at any time or periodically, while the user wears the portable terminal of a wrist watch type around his/her wrist. The information communication system 100 can successively carry out personal verification of the user.

(A3) Description of Third Modification

When the personal verification apparatus 10 is built in the operating device such as the mouse 1, the keyboard 7 or the like, a cable is necessary to transmit a blood vessel image, together with an ordinary mouse cable. This is the same even when the mouse 1 or the keyboard 7 is connected in radio to the computer 2 or 6.

Figure 15:
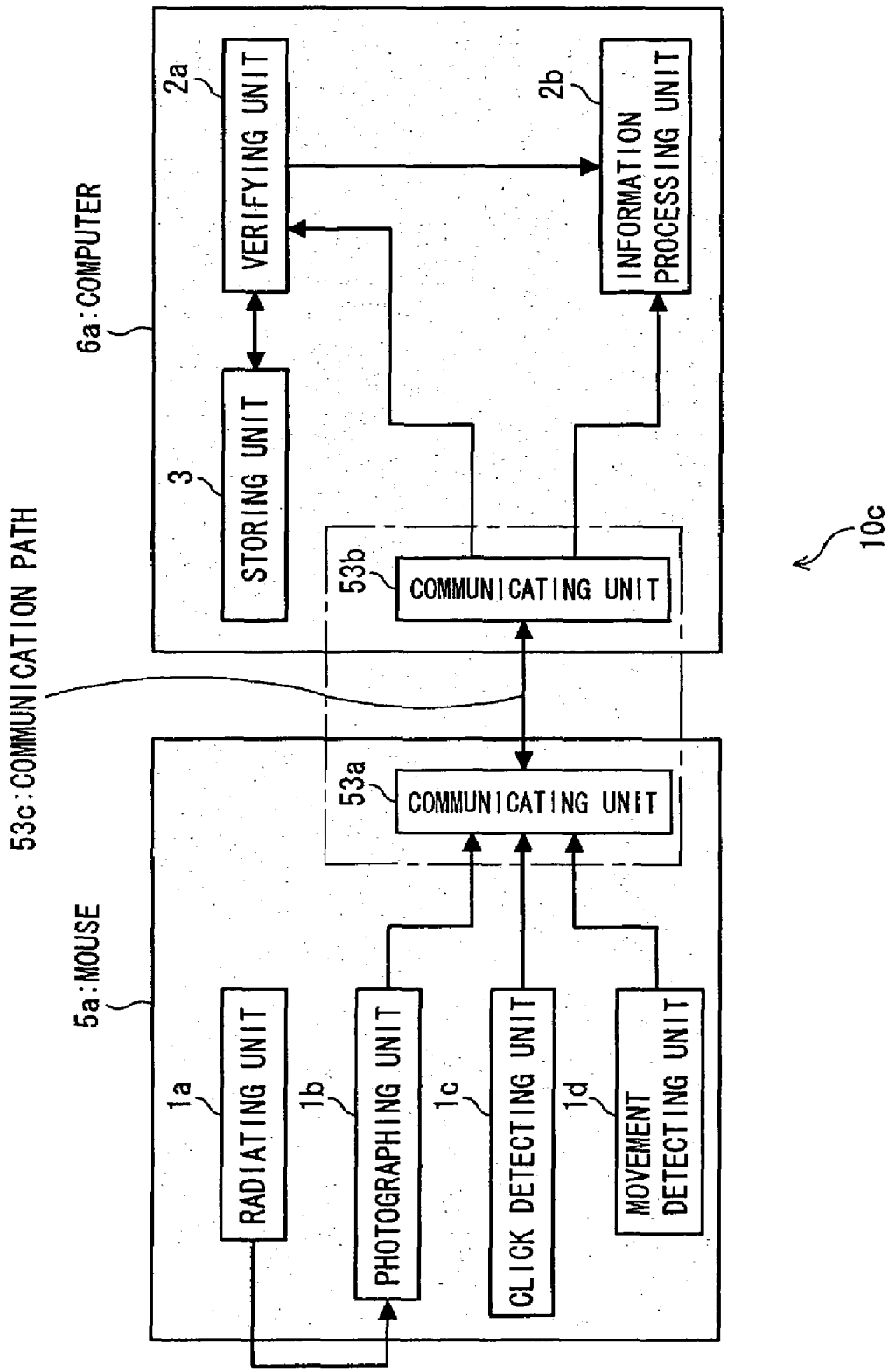
FIG. 15 is a block diagram of a processor with a personal verification function according to a third embodiment of this invention.

FIG. 15 is a block diagram of a personal verification apparatus according to a third modification of the first embodiment of this invention. A personal verification apparatus 10c shown in FIG. 15 has a function possessed by the personal verification apparatus 10 and a function of unitarily transmitting data between a mouse 5a and a computer 6a. The personal verification apparatus 10c is provided with the mouse 5a having a function of unitarily transmitting data. The mouse 5a and the computer 6a have communicating units 53a and 53b unitarily transmitting data, respectively, and uses a communicating path 53c unitarily transmitting data between the mouse 5a and the computer 6a.

Nowadays, it becomes more often that USB (Universal Serial Bus) interface is used to control peripheral equipment of a personal computer. Owing to USB interface, it is possible to attach a plurality of devices to one cable. Desirably, USB interface is used for the communicating units 53a and 53b, and the communication path 53c, for example.

In other words, the personal verification apparatus 10c uses the communication path 53c as a communication path for transmitting data relating to operations of the mouse 5a or the like to the computer 6a, and a communication path for transmitting a photographed blood vessel image to a verifying unit 2a. Here, data relating to the operations of the mouse 5a signifies detection of a click of the mouse 5a, detection of a movement of the mouse 5a, detection of a rotary wheel, etc., for example. Data relating to operations of a keyboard signifies data representing a key pressed down by the user, for example.

Meanwhile, like reference characters designate like or corresponding parts in the drawings.

With the above structure, a photographed blood vessel image from the mouse 5a, data of detection of a click and detection of a movement of the mouse 5a are put together in the communicating unit 53a, and outputted to the communication path 53c. All the data is inputted to the verifying unit 2a and an information processing unit 2b through the communicating unit 53b of the computer 6a. Data in the opposite direction from the verifying unit 2a and the information processing unit 2b is inputted to a photographing unit 1b, etc. of the mouse 5a through the communicating units 53c and 53a.

By providing the communication path 53c, it becomes possible to put together communication cables into one, and save wasteful wiring. Additionally, an effect by a fault occurring in the communication path 53c can be diminished in the personal verification apparatus 10c.

By providing the communication path 53c, it is possible to simplify the communication cable, so that the information communication system 100 can be improved relatively easily, and the cost performance can be improved.

(B) Description of Second Embodiment of the Invention

For the purpose of improvement of security using the IC card 3a, it is necessary to prevent leakage of a blood vessel image of a person to a third party, or prevent a loss caused by that details of the verifying method becomes known. It is possible to improve the security with the IC card 3a. The IC card (or a storage medium) 3a comprises an extracting unit [the image processing unit 52 shown in FIG. 4(a)] extracting a blood vessel image. The following choices (4-1) through (4-3) are possible in the security with the IC card 3a.

(4-1) Only the storing unit 3 is realized with the IC card 3a, so that it becomes difficult to read a registration blood vessel image, which leads to improvement of the security.

(4-2) The storing unit 3 and the verifying unit 2a are both realized with the IC card 3a, whereby a registration blood vessel image is prevented from being outputted to the outside from the IC card 3a, which leads to further improvement of the security.

(4-3) The storing unit 3, the verifying unit 2a and the image processing unit 52 extracting a blood vessel image are realized with the IC card 3a, whereby information on how a blood vessel image stored in the IC card 3a is expressed can be prevented from leaking to the outside, which leads to still further improvement of the security. Incidentally, the IC card 3a may be connected to the computer 2, the mouse 5a, or the like.

(C) Others

Note that the present invention is not limited to the above examples, but may be modified in various ways without departing from the scope of the invention.

The invention claimed is:

1. An apparatus comprising:
    an operating device used by a hand to operate a terminal, and being able to output a photographic blood vessel image obtained by photographing a blood vessel image of the hand;
    a personal verification unit carrying out personal verification at a desired time on the basis of both the photographic blood vessel image outputted from said operating device and a registration blood vessel image;
    a determining unit making a determination as to whether the photographic blood vessel image is valid and thereby suitable for collation, on the basis of a result of an examination as to whether an average pixel value of the photographic blood vessel image falls within a desired range; and
    a verification time determining unit, when said determining unit determines that the photographic blood vessel image is valid, determining said desired time according to the determination made by said determining unit.

2. An apparatus according to claim 1, wherein said operating device comprises:
    a radiating unit radiating near-infrared light toward the palm of the hand; and
    a photographing unit photographing the photographic blood vessel image using light reflected from the palm of the hand.

3. An apparatus according to claim 1, wherein said personal verification unit comprises:
    a storing unit storing the registration blood vessel image; and
    a verifying unit collating the photographic blood vessel image, photographed by said photographing unit, with the registration blood vessel image, stored in said storing unit, at the desired time to carry out the personal verification.

4. An apparatus according to claim 1, wherein said determining unit outputs a warning when the photographic blood vessel image is determined to be not valid.

5. An apparatus according to claim 1, wherein said determining unit stops an operation of said system when the photographic blood vessel image is determined to be not valid.

6. An apparatus according to claim 1, wherein said operating device is a mouse, and said mouse has a projecting portion formed to fit the palm of the hand, said portion being made from a material permeable to near-infrared light.

7. An apparatus according to claim 1, wherein said mouse comprises one or more reflecting units for reflecting radiated light.

8. An apparatus according to claim 1, wherein an optical axis of the near-infrared light is inclined toward a rear of said mouse away from the vertical direction.

9. An apparatus according to claim 2, wherein said operating device is a keyboard, and said radiating unit and said photographing unit are disposed in a portion of said keyboard which faces hands.

10. An apparatus according to claim 1, wherein said personal verification unit combines the results of verification of a plurality of photographic blood vessel images and carries out collation based on the combined results.

11. An apparatus according to claim 1, wherein said personal verification unit carries out collation based on the result of verification using a plurality of photographic blood vessel images.

12. An apparatus according to claim 4, wherein said personal verification unit performs collation with at least one of a plurality of photographic blood vessel images determined as valid by said determining unit.

13. An apparatus according to claim 1, wherein said operating device uses a communication path as both a first communication path for transmitting data relating to operations to said terminal and a second communication path for transmitting the photographic blood vessel image to said personal verification unit.

14. An apparatus according to claim 3, wherein said storing unit stores the photographic blood vessel image using an IC card.

15. An apparatus according to claim 14, wherein said IC card has said personal verification unit.

16. An apparatus according to claim 15, wherein said IC card has a function of extracting a blood vessel image.

17. An apparatus according to claim 3, wherein at least either said storing unit or said verifying unit is disposed in said operating device, said terminal or a host terminal connected to said terminal.

18. An apparatus comprising:

an operating device used by a hand to operate a terminal, and being able to output a photographed blood vessel image obtained by photographing a blood vessel image of a hand;

a personal verification unit carrying out personal verification at a desired time on the basis of both the photographic blood vessel image outputted from said operating device and a registration blood vessel image;

a determining unit making a determination as to whether the photographic blood vessel image is valid and thereby suitable for collation on the basis of a difference between the photographic blood vessel image and a previous photographic blood vessel image photographed by said photographing unit; and a verification time determining unit, when said determining unit determines that the photographic blood vessel image is valid, determining said desired time according to the determination made by said determining unit.

19. An apparatus comprising:

an operating device used by a hand to operate a terminal, and being able to output a photographed blood vessel image obtained by photographing a blood vessel image of a hand;

a personal verification unit carrying out personal verification at a desired time on the basis of both the photographic blood vessel image outputted from said operating device and a registration blood vessel image;

a determining unit making a determination as to whether the photographic blood vessel image is valid and thereby suitable for collation based on at least either the intensity of visible light of the photographic blood vessel image or the change in visible light between the photographic blood vessel image and a previous photographic blood vessel image photographed aforetime by said photographing unit; and a verification time determining unit, when said determining unit determines that the photographic blood vessel image is valid, determining said desired time according to the determination made by said determining unit.

* * * * *

UNITED STATES PATENT AND TRADEMARK OFFICE
CERTIFICATE OF CORRECTION

PATENT NO. : 7,359,531 B2
APPLICATION NO. : 10/372113
DATED : April 15, 2008
INVENTOR(S) : Toshio Endoh et al.

Page 1 of 1

It is certified that error appears in the above-identified patent and that said Letters Patent is hereby corrected as shown below:

Title page, col. 2, line 4

OTHER PUBLICATIONS
Delete "Camahan" and insert --Carnahan--, therefor.

Col. 23, line 15, delete "claim 1," and insert --claim 6,--, therefor.

Col. 23, line 18, delete "claim 1," and insert --claim 6--, therefor.

Signed and Sealed this

Twelfth Day of August, 2008

JON W. DUDAS
*Director of the United States Patent and Trademark Office*